(12) United States Patent
Shi et al.

(10) Patent No.: US 11,990,163 B2
(45) Date of Patent: May 21, 2024

(54) MULTILAYER STRUCTURES FOR MAGNETIC RECORDING DEVICES TO FACILITATE TARGETED MAGNETIC SWITCHING AND LOW COERCIVITY

(71) Applicant: Western Digital Technologies, Inc., San Jose, CA (US)

(72) Inventors: Ning Shi, San Jose, CA (US); Brian R. York, San Jose, CA (US); Susumu Okamura, San Jose, CA (US); Suping Song, Fremont, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 30 days.

(21) Appl. No.: 17/854,617

(22) Filed: Jun. 30, 2022

(65) Prior Publication Data
US 2024/0005951 A1    Jan. 4, 2024

(51) Int. Cl.
*G11B 5/39*    (2006.01)

(52) U.S. Cl.
CPC .......... *G11B 5/3929* (2013.01); *G11B 5/3912* (2013.01)

(58) Field of Classification Search
None
See application file for complete search history.

(56) References Cited

U.S. PATENT DOCUMENTS

| | | | |
|---|---|---|---|
| 3,794,835 A * | 2/1974 | Hirai | H01L 31/109 148/DIG. 72 |
| 5,948,553 A * | 9/1999 | Kamijo | H01F 10/3204 324/252 |
| 7,522,377 B1 | 4/2009 | Jiang et al. | |
| 7,914,916 B2 | 3/2011 | Inturi et al. | |
| 8,329,320 B2 | 12/2012 | Zhang et al. | |
| 9,805,743 B2 | 10/2017 | Wang et al. | |
| 2001/0055185 A1* | 12/2001 | Ooshima | B82Y 25/00 360/324.11 |
| 2004/0125513 A1* | 7/2004 | Tanaka | G11B 5/3906 29/603.18 |

(Continued)

OTHER PUBLICATIONS

Wang, Xuan et al., "Preparation of soft magnetic FeCo-based films for writers", Journal of Applied Physics, vol. 105, Issue 7, Mar. 2009, <http://dx.doi.org/10.1063/1.3078008>.

(Continued)

*Primary Examiner* — Peter Vincent Agustin
(74) *Attorney, Agent, or Firm* — PATTERSON + SHERIDAN, LLP

(57) ABSTRACT

Aspects of the present disclosure generally relate to magnetic recording heads (such as write heads of data storage devices) that include multilayer structures to facilitate targeted switching and relatively low coercivity. In one or more embodiments, a magnetic recording head includes an iron-cobalt (FeCo) layer having a crystalline structure that is a cubic lattice structure, a first crystalline layer formed of a first material, and a second crystalline layer between the first crystalline layer and the FeCo layer. The second crystalline layer is formed of a second material different from the first material, and the second crystalline layer interfaces both the FeCo layer and the first crystalline layer. The crystalline structure of the FeCo layer has a texture of <100>.

28 Claims, 13 Drawing Sheets

(56) References Cited

U.S. PATENT DOCUMENTS

| | | | |
|---|---|---|---|
| 2005/0069730 A1* | 3/2005 | Doerner | G11B 5/7379 360/135 |
| 2006/0057430 A1* | 3/2006 | Kuboki | G11B 5/65 428/836.2 |
| 2008/0253024 A1* | 10/2008 | Miyata | G11B 5/3116 360/234.3 |
| 2009/0251951 A1* | 10/2009 | Yoshikawa | G11C 11/1675 365/158 |
| 2012/0154081 A1* | 6/2012 | Suzuki | G11B 5/3909 427/131 |
| 2021/0390977 A1* | 12/2021 | Freitag | G11B 5/314 |

OTHER PUBLICATIONS

Gunther, Scheunert et al., "A review of high magnetic moment thin films for microscale and nanotechnology applications", Applied Physics Reviews, Feb. 2016, pp. 1-4, <https://www.osti.gov/biblio/1338947>.

Tagawa, Ikuya et al., "High-Performance Write Head Design and Materials", Dec. 2001, pp. 164-173, <https://www.fujitsu.com/global/documents/about/resources/publications/fstj/archives/vol37-2/paper07.pdf>.

Sun, N. X. et al., "Stress, microstructure, and magnetic softness of high saturation magnetization (Bs) FeCON films", American Institute of Physics, Journal of Applied Physics, May 2005, <https://www.researchgate.net/publication/252592757>.

Akansel, Serkan et al., "Effect of seed layers on dynamic and static magnetic properties of Fe65Co35 thin films", Journal of Physics D: Applied Physics, vol. 51, Jul. 2018, <https://doi.org/10.1088/1361-6463/aaccc0>.

Katada, H. et al., Soft magnetic properties and microstructure in NiFe/FeCo/NiFe films with large saturation magnetization, IEEE International Magnetics Conference, 2002, <https://ieeexplore.ieee.org/document/1000670>.

Herzer, G. "Grain size dependence of coercivity and permeability in nanocrystalline ferromagnets", IEEE Transactions on Magnetics, vol. 26, No. 5, Sep. 1990, pp. 1397-1402, <https://sci-hub.se/10.1109/20.104389>.

Punkkinen, M.P.J. et al., "Surface properties of 3d transition metals", Philosophical Magazine, vol. 91, No. 27, Sep. 2011, pp. 3627-3640, <https://sci-hub.se/https://doi.org/10.1080/14786435.2011.586953>.

O'Handley, Robert C., "Modern Magnetic Materials: Principles and Applications", Nov. 1999, pp. 179-183, <https://vdoc.pub/documents/modern-magnetic-materials-principles-and-applications-5q71nkp7jtb0>.

* cited by examiner

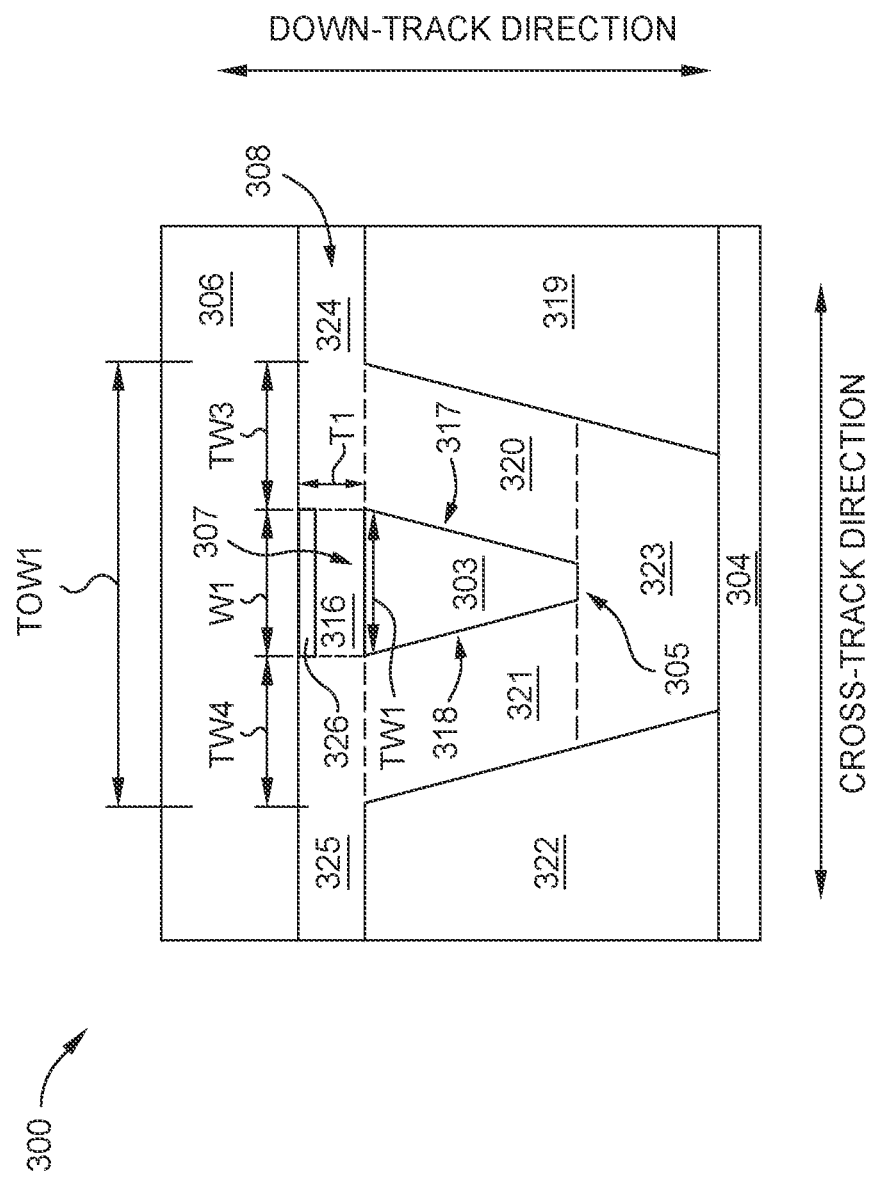

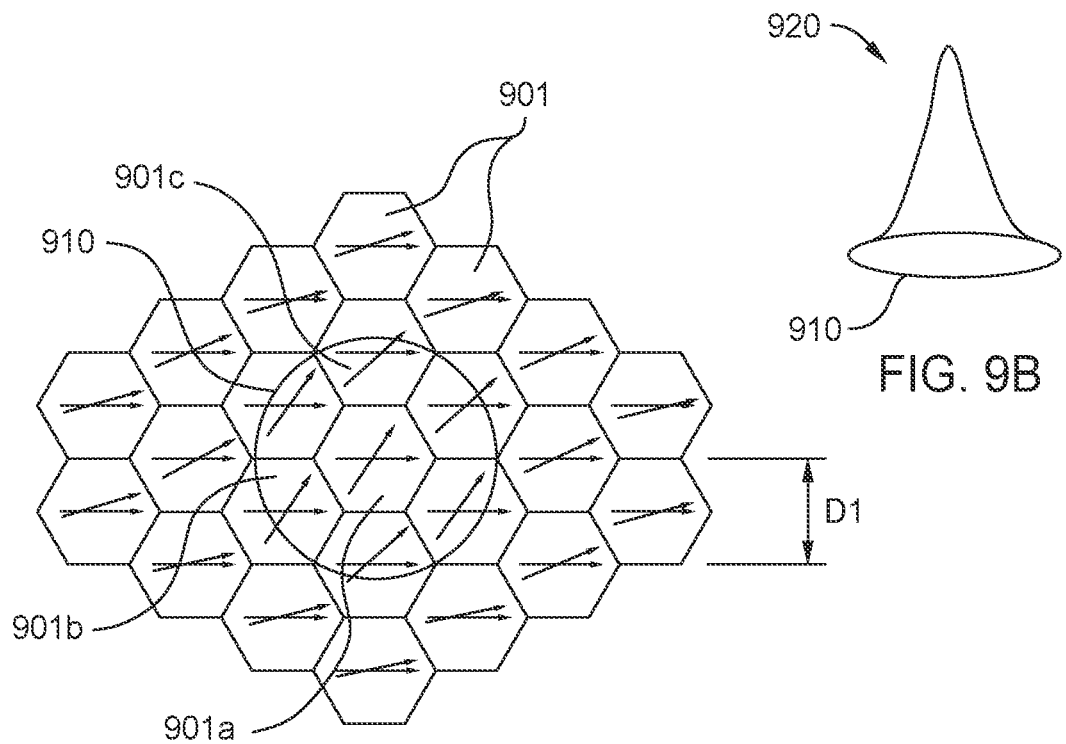
FIG. 9A
FIG. 9B
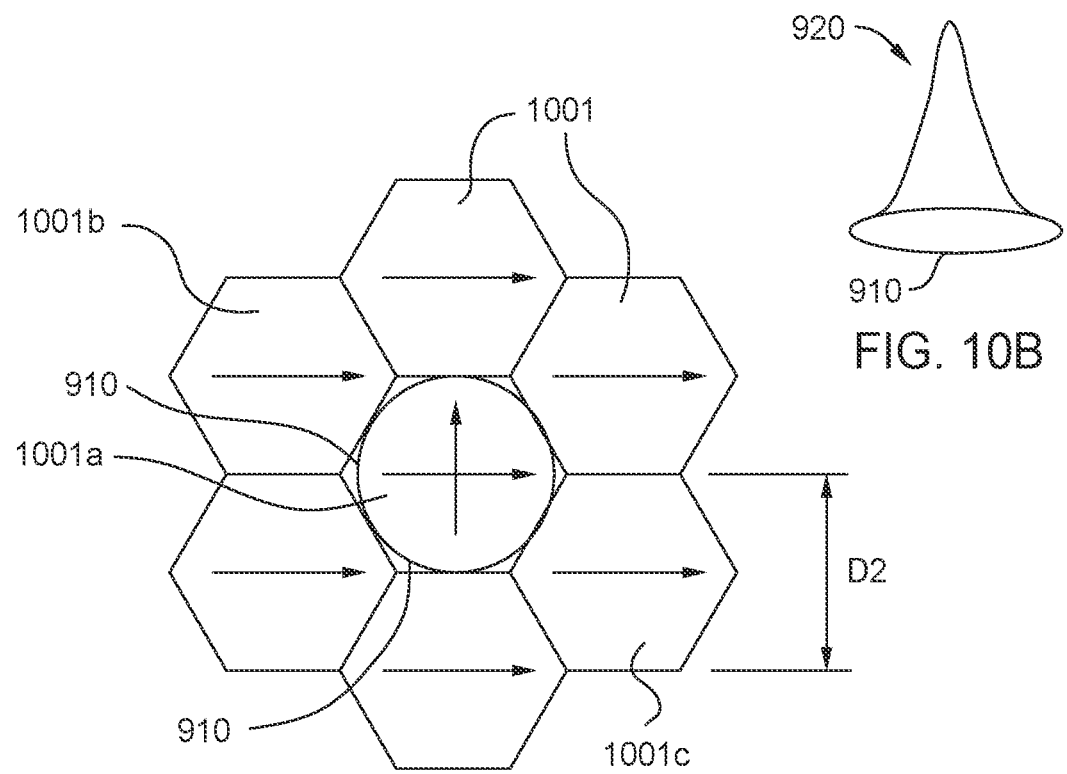
FIG. 10A
FIG. 10B

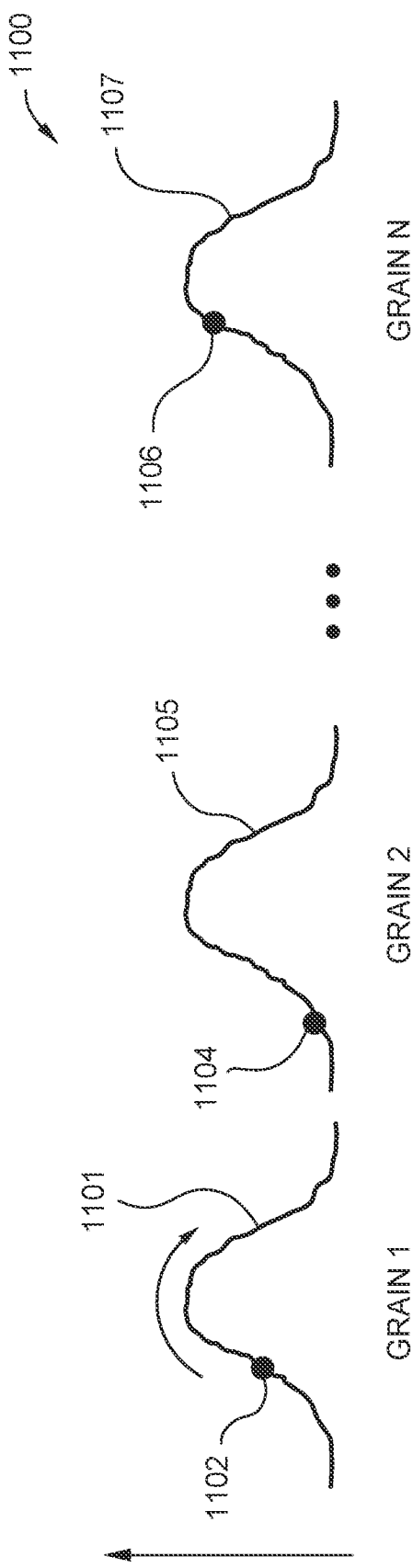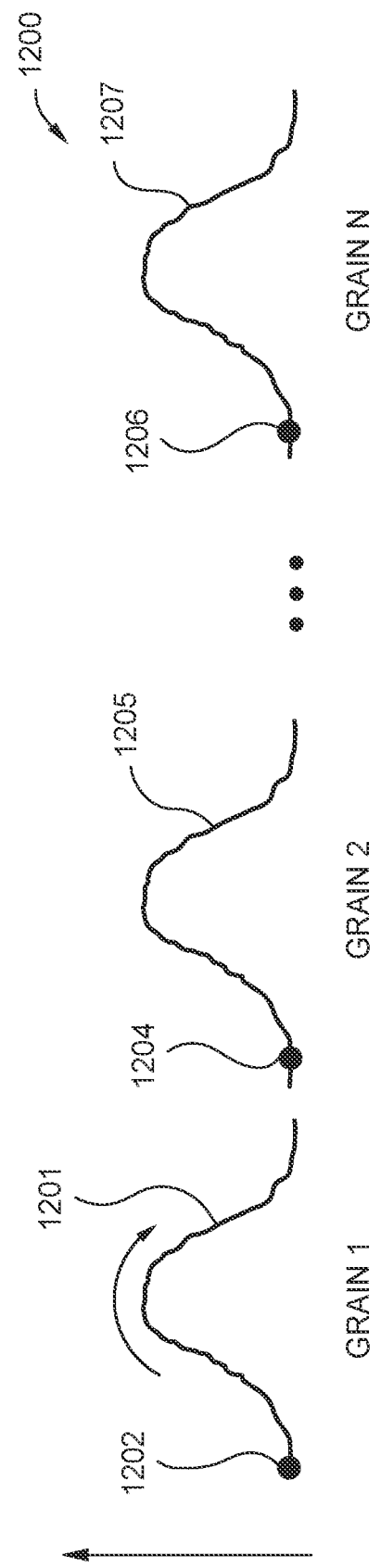

| Implementation | Hce | Sqre | Hch | Sqrh | Texture |
|---|---|---|---|---|---|
| Implementation 1 | 20.67 | 0.9394 | 17.81 | 0.9166 | 100 |
| Implementation 2 | 20.76 | 0.936 | 17.99 | 0.937 | 100 |
| Implementation 3 | 77.66 | 0.9781 | 76.06 | 0.9743 | 110 |
| Implementation 4 | 64.78 | 0.9757 | 63.46 | 0.9757 | 110 |
| Implementation 5 | 13.13 | 0.9771 | 10.86 | 0.9354 | 110 |

FIG. 15A

| Implementation | FeCo Thk, Å | Grain Size, Å | Texture |
|---|---|---|---|
| Implementation 1 | 900 | 240-280 | 100 |
| Implementation 2 | 900 | 240-280 | 100 |
| Implementation 3 | 700 | 230 | 110 |
| Implementation 4 | 700 | 360 | 110 |
| Implementation 5 | 700 | 170 | 110 |

FIG. 15B

MULTILAYER STRUCTURES FOR MAGNETIC RECORDING DEVICES TO FACILITATE TARGETED MAGNETIC SWITCHING AND LOW COERCIVITY

BACKGROUND OF THE DISCLOSURE

Field of the Disclosure

Aspects of the present disclosure generally relate to magnetic recording heads (such as write heads of data storage devices) that include multilayer structures to facilitate targeted switching and relatively low coercivity.

Description of the Related Art

The heart of the functioning and capability of a computer is the storing and writing of data to a data storage device, such as a hard disk drive (HDD). The volume of data processed by a computer is increasing rapidly. There is a need for higher recording density of a magnetic recording medium to increase the function and the capability of a computer.

The volume of data processed by a computer is increasing rapidly. There is a need for higher recording density of a magnetic recording medium (such as recording densities exceeding 2 Tbit/in$^2$ for a magnetic recording medium) to increase the function and the capability of a computer.

To facilitate high recording densities and operational efficiency, multiple aspects may be used. For example, the write and read signals may be pulsed. As another example, ferromagnetic materials with small grains can be used to facilitate softer magnetic responses.

However, challenges can arise. For example, because of the nature of modern magnetic record heads, non-uniform magnetic fields can result in non-uniform switching of grains where the grains are intergranularly exchange coupled. As a result, unintentional switching of neighboring grains can occur. This unintentional parasitic switching of grains can involve large amounts of unnecessary energy expenditures, hindering the writing process.

Therefore, there is a need for magnetic recording heads that simply and effectively facilitate targeted high density magnetic switching at relatively low coercivities while reducing or eliminating effects on neighboring grains.

SUMMARY OF THE DISCLOSURE

Aspects of the present disclosure generally relate to magnetic recording heads (such as write heads of data storage devices) that include multilayer structures to facilitate targeted switching and relatively low coercivity. In one or more embodiments, a magnetic recording head includes an iron-cobalt (FeCo) layer having a crystalline structure that is body-centered cubic (BCC), a first crystalline layer formed of a first material, and a second crystalline layer between the first crystalline layer and the FeCo layer. The second crystalline layer is formed of a second material different from the first material, and the second crystalline layer interfaces both the FeCo layer and the first crystalline layer. The crystalline structure of the FeCo layer has a texture of <100>.

In one implementation, a magnetic recording head includes an iron-cobalt (FeCo) layer having a crystalline structure that is a cubic lattice structure, a first crystalline layer formed of a first material; and a second crystalline layer between the first crystalline layer and the FeCo layer. The second crystalline layer is formed of a second material different from the first material, and the second crystalline layer interfaces both the FeCo layer and the first crystalline layer.

In one implementation, a magnetic recording head includes a lower pole, an upper pole, a main pole between the upper pole and the lower pole, and one or more shield structures between the upper pole and the main pole. At least one of the main pole, the lower pole, the upper pole, or the one or more shield structures includes a multilayer structure. The multilayer structures includes an iron-cobalt (FeCo) layer having a crystalline structure that is a cubic lattice structure.

In one implementation, a magnetic recording head includes a ferromagnetic layer. The magnetic recording head includes a first crystalline layer formed of a first material, and a second crystalline layer between the first crystalline layer and the ferromagnetic layer. The second crystalline layer is formed of a second material different from the first material, and the second crystalline layer interfaces both the ferromagnetic layer and the first crystalline layer.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 3C is an enlarged view of the schematic media facing surface cross-sectional view of the magnetic recording head shown in FIG. 3B, according to one implementation.

FIG. 9A is a schematic grain view of a plurality of grains of a layer, according to one implementation.

FIG. 9B is a schematic graphical view of a gradient of the localized magnetic field applied in FIG. 9A, according to one implementation.

FIG. 10A is a schematic grain view of a plurality of grains of the FeCo layer shown in FIG. 4, due to exchange coupling, according to one implementation.

FIG. 10B is a schematic graphical view of the same gradient of the localized magnetic field shown in FIG. 9B, according to one implementation.

FIG. 11 is a schematic graphical view of a graph showing energy needed to magnetically switch individual grains of the plurality of grains shown in FIG. 9A under a uniform field, according to one implementation.

FIG. 12 is a schematic graphical view of a graph showing energy needed to magnetically switch individual decoupled grains of the plurality of grains shown in FIG. 10A under a uniform field, according to one implementation.

FIGS. 15A and 15B are schematic table views of tables showing testing data of FeCo layers for various implementations.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
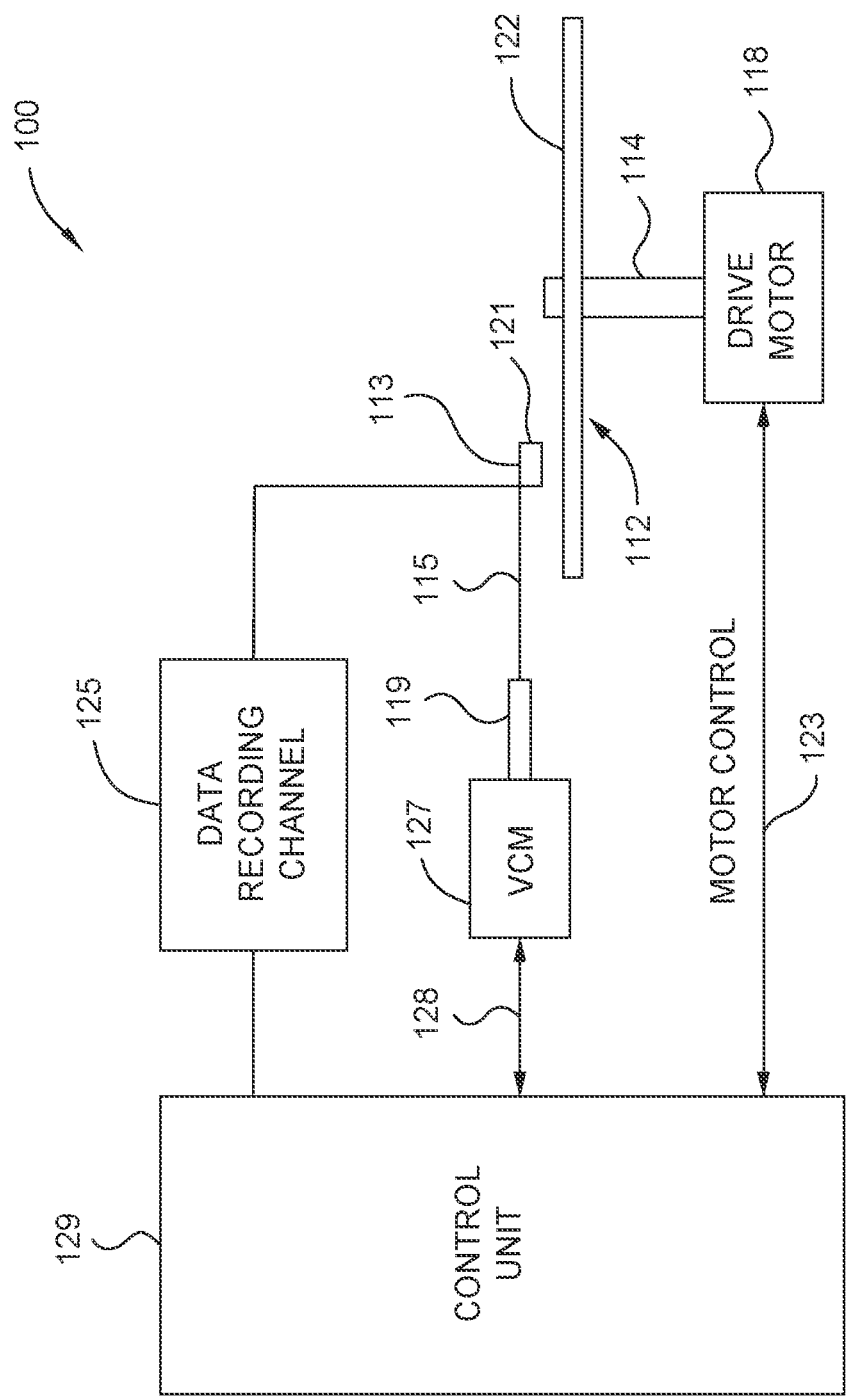
FIG. 1 illustrates a schematic view of a disk drive, according to one implementation.

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure generally relate to magnetic recording heads (such as write heads of data storage devices) that include multilayer structures to facilitate targeted high areal density switching and relatively low coercivity. In one or more embodiments, a magnetic recording head includes an iron-cobalt (FeCo) layer having a crystalline structure that is body-centered cubic (BCC), a first crystalline layer formed of a first material, and a second crystalline layer between the first crystalline layer and the FeCo layer. The second crystalline layer is formed of a second material different from the first material, and the second crystalline layer interfaces both the FeCo layer and the first crystalline layer. The crystalline structure of the FeCo layer has a BCC orientation texture of <100>. The first crystalline layer is formed of an alloy, and the second crystalline layer is formed of chromium (Cr). The second crystalline layer has a crystalline structure that is body-centered cubic (BCC) and has a texture of <100>. The first crystalline layer has a crystalline structure that is ordered BCC (such as B2) and has a texture of <100>. The crystalline structure of the first crystalline layer can be any ordered structure, such as B2.

The aspects described herein facilitate targeted magnetic switching at low coercivities in a manner that is simple, reliable, efficient, and cost-effective. The lower coercivities and targeted switching facilitate enhanced writing efficiencies, enhanced overwrite performance, increased linear density and recording density, reduced pole erasure (such as erasure from the main pole), reduced cross track interference (xTI) degradation, and less write field leakage from shield structures (such as from a trailing shield). The lower coercivities also facilitate using soft shield materials for shield structures, which facilitates operational efficiencies.

Aspects of the present disclosure relate to data storage devices using a write head. The write head can be an energy-assisted magnetic recording (EAMR) write head, a microwave-assisted magnetic recording (MAMR) write head, or a heat-assisted magnetic recording (HAMR) write head.

Unless specified otherwise, the chemicals referred to herein can have any number of atoms for the elements included (e.g., stoichiometric or non-stoichiometric).

FIG. 1 illustrates a schematic view of a disk drive 100, according to one implementation. As shown, at least one rotatable magnetic media 112 is supported on a spindle 114 and rotated by a disk drive motor 118. The magnetic recording on each disk is in the form of any suitable patterns of data tracks, such as annular patterns of concentric data tracks on the magnetic media 112.

At least one slider 113 is positioned near the magnetic media 112, each slider 113 supporting one or more magnetic head assemblies 121. As the magnetic media rotates, the slider 113 moves radially in and out over the media surface 122 so that the magnetic head assembly 121 may access different tracks of the magnetic media 112 where data are written. Each slider 113 is attached to an actuator arm 119 by way of a suspension 115. The suspension 115 provides a slight spring force which biases the slider 113 toward the media surface 122. Each actuator arm 119 is attached to an actuator means 127. The actuator means 127 as shown in FIG. 1 may be a voice coil motor (VCM). The VCM includes a coil movable within a fixed magnetic field. The direction and speed of the coil movements are controlled by the motor current signals supplied by a control unit 129.

During operation of the disk drive 100, the rotation of the magnetic media 112 generates an air bearing between the slider 113 and the media surface 122 which exerts an upward force or lift on the slider 113. The air bearing thus counterbalances the slight spring force of suspension 115 and supports slider 113 off and slightly above the magnetic media 112 surface by a small, substantially constant spacing during normal operation. The AC magnetic field generated from the magnetic head assembly 121 lowers the coercivity of the high-coercivity media so that the write elements of the magnetic head assemblies 121 may correctly magnetize the data bits in the magnetic media 112.

The various components of the disk drive 100 are controlled in operation by control signals generated by the control unit 129, such as access control signals and internal clock signals. The control unit 129 can include logic control circuits, storage means, and a microprocessor. The control unit 129 generates control signals to control various system operations, such as drive motor control signals on line 123 and head position and seek control signals on line 128. The control signals on line 128 provide the desired current profiles to optimally move and position slider 113 to the desired data track on the magnetic media 112. Write and read signals are communicated to and from write and read heads on the magnetic head assembly 121 by way of recording channel 125.

The above description of a typical magnetic disk storage system and the accompanying illustration of FIG. 1 are for representation purposes only. It should be apparent that disk storage systems may contain a large number of disks and actuators, and each actuator may support a number of sliders.

Figure 2:
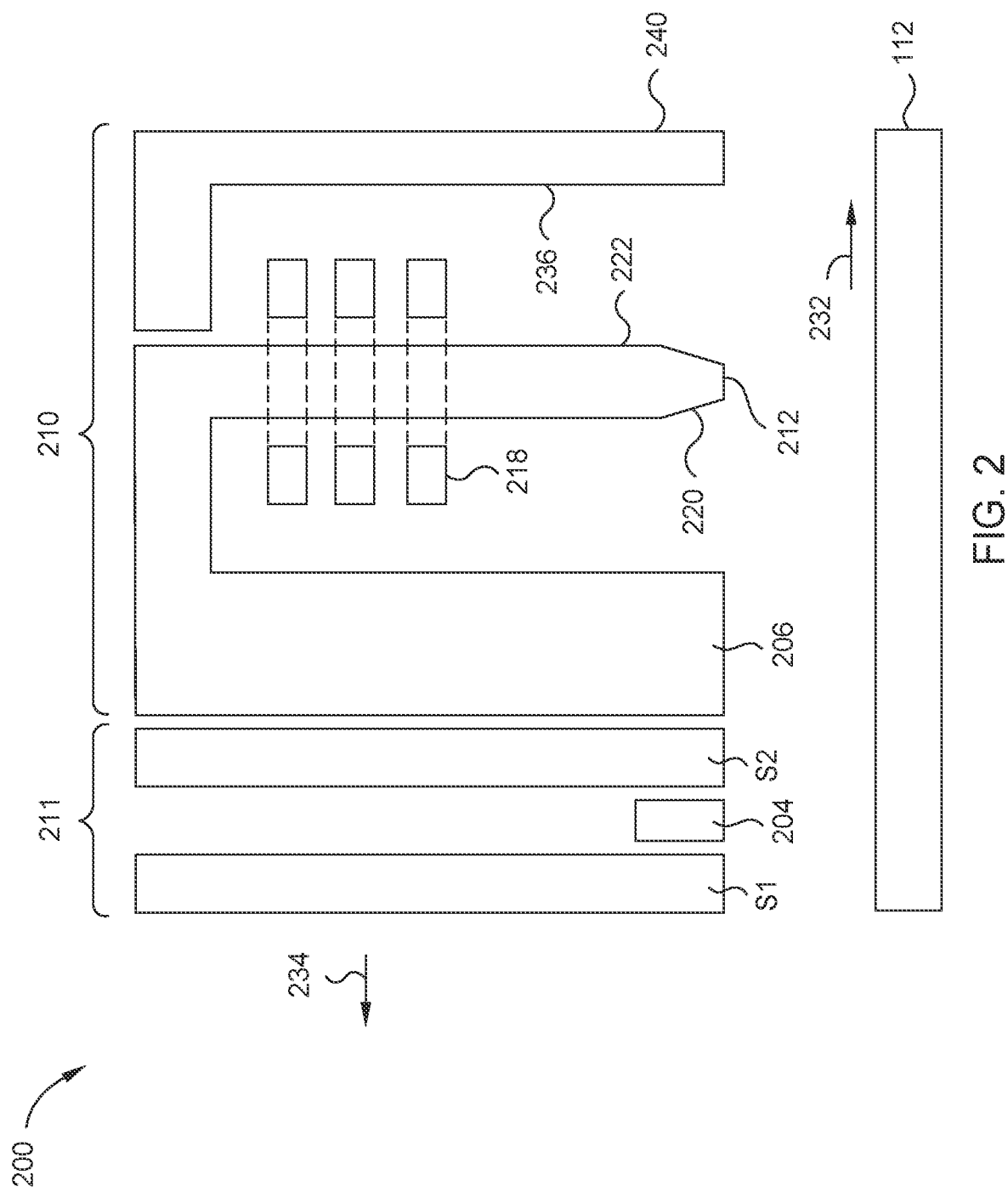
FIG. 2 is a fragmented and schematic cross-sectional side view through a center of a read/write head facing the magnetic media, according to one implementation.

FIG. 2 is a fragmented and schematic cross-sectional side view through a center of a read/write head 200 facing the magnetic media 112, according to one implementation. The read/write head 200 may correspond to the magnetic head assembly 121 described in FIG. 1. The read/write head 200 includes a media facing surface (MFS) 212, such as an air bearing surface (ABS), a magnetic write head 210, and a magnetic read head 211, and is mounted such that the MFS 212 is facing the magnetic media 112. The read/write head 200 may be an energy-assisted magnetic recording (EAMR) head, a microwave-assisted magnetic recording (MAMR) head, or a heat-assisted magnetic recording (HAMR) head. In FIG. 2, the magnetic media 112 moves past the write head 210 in the direction indicated by the arrow 232 such that the read/write head 200 moves relative to the magnetic media 112 in the direction indicated by the arrow 234.

In one embodiment, which can be combined with other embodiments, the magnetic read head 211 is a magnetoresistive (MR) read head that includes an MR sensing element 204 located between MR shields S1 and S2. In one embodiment, which can be combined with other embodiments, the magnetic read head 211 is a magnetic tunnel junction (MTJ) read head that includes a MTJ sensing element 204 located between MR shields S1 and S2. The magnetic fields of the adjacent magnetized regions in the magnetic media 112 are detectable by the MR (or MTJ) sensing element 204 as the recorded bits.

The write head 210 includes a return pole 206, a main pole 220, a trailing shield 240, and a coil 218 that excites the main pole 220. The coil 218 may have a "pancake" structure which winds around a back-contact between the main pole 220 and the return pole 206, instead of a "helical" structure shown in FIG. 2. A trailing gap and a leading gap may be in contact with the main pole, and a leading shield may be in contact with the leading gap. A recording magnetic field (e.g., a write field) is generated from the main pole 220 and the trailing shield 240 facilitates making the magnetic field gradient of the main pole 220 steep. The main pole 220 may be a magnetic material such as an FeCo alloy. The main pole 220 may include a trailing surface 222 which may be parallel to a leading surface 236 of the trailing shield 240. The main pole 220 may be a tapered write pole (TWP) with a trailing edge taper (TET) configuration. In one embodiment, which can be combined with other embodiments, the main pole 220 has a saturated magnetization (Ms) of 2.4 T and a thickness of about 300 nanometers (nm). The trailing shield 240 may be a magnetic material such as NiFe alloy. In one embodiment, which can be combined with other embodiments, the trailing shield 240 has an Ms of about 1.6 T.

Figure 3A:
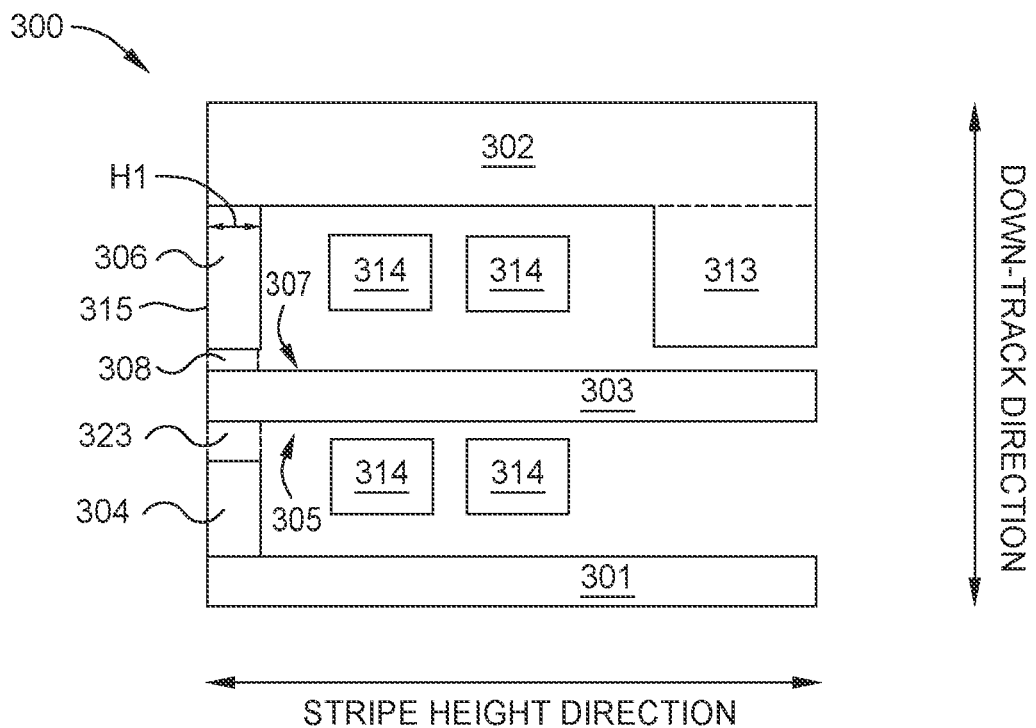
FIG. 3A is a schematic cross-sectional throat view of a magnetic recording head, according to one implementation.

FIG. 3A is a schematic cross-sectional throat view of a magnetic recording head 300, according to one implementation. The magnetic recording head 300 may be used in a magnetic recording device, such as a hard disk drive (HDD). In one embodiment, which can be combined with other embodiments, the magnetic recording head 300 is used as at least part of the write head 210 shown in FIG. 2. The present disclosure contemplates that although aspects herein are described in relation to a write head (such as the write head 210), such aspects can be used in relation to a read head (such as the read head 211).

It is to be understood that the magnetic recording head discussed herein is applicable to a data storage device such as a hard disk drive (HDD) as well as a tape drive such as a tape embedded drive (TED) or an insertable tape media drive. An example TED is described in co-pending patent application titled "Tape Embedded Drive," U.S. application Ser. No. 16/365,034, filed Mar. 31, 2019, assigned to the same assignee of this application, which is herein incorporated by reference. As such, any reference in the detailed description to an HDD or tape drive is merely for exemplification purposes and is not intended to limit the disclosure unless explicitly claimed. Furthermore, reference to or claims directed to magnetic recording devices are intended to include both HDD and tape drive unless HDD or tape drive devices are explicitly claimed.

The magnetic recording head 300 includes a lower pole 301, an upper pole 302, and a main pole 303 between the upper pole 302 and the lower pole 301. The magnetic recording head 300 also includes a leading shield 304 on a leading side 305 of the main pole 303, and a trailing shield 306 on a trailing side 307 of the main pole 303. The magnetic recording head 300 includes a media facing surface (MFS) 315, such as an air bearing surface (ABS).

The trailing shield 306 is of a height H1 along the stripe height direction. The height H1 is of 0.5 microns (500 nanometers) or less, such as about 500 nanometers. A trailing side gap 308 is disposed between the main pole 303 and the trailing shield 306. In one embodiment, which can be combined with other embodiments, the upper pole 302 includes a ledge 313 that protrudes from the upper pole 302 and toward the main pole 303. The magnetic recording head 300 includes a coil structure 314. The coil structure 314 can be a "pancake" structure that winds around the trailing side 307 of the main pole 303, or can be a "helical" structure that winds around the main pole 303.

Figure 3B:
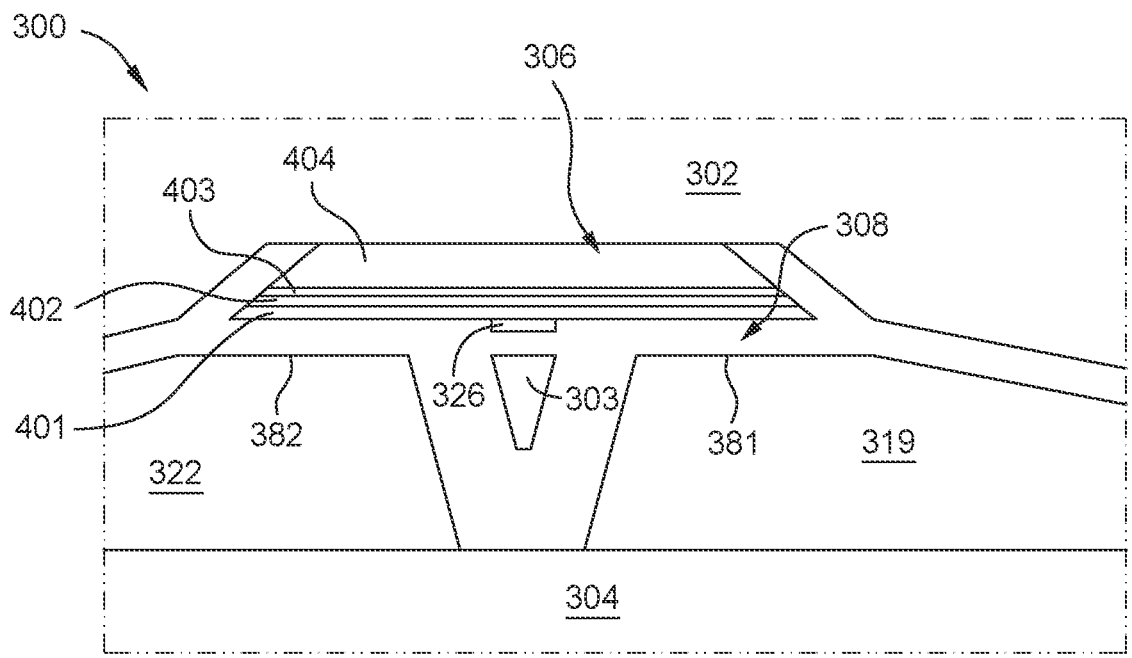
FIG. 3B is a schematic media facing surface cross-sectional view of the magnetic recording head shown in FIG. 3A, according to one implementation.

FIG. 3B is a schematic media facing surface cross-sectional view of the magnetic recording head 300 shown in FIG. 3A, according to one implementation. Layers 401-404 will be further described in conjunction with FIG. 4, and are shown here to put the layers in context of the overall magnetic head construction. In this example, the layers are shown as a part of the trailing shield 326 but can be implemented in other components of the recording head in various embodiments, as further described below.

FIG. 3C is an enlarged view of the schematic media facing surface cross-sectional view of the magnetic recording head 300 shown in FIG. 3B, according to one implementation.

The magnetic recording head 300 includes a first side gap 320 disposed on a first side 317 of the main pole 303, and a first side shield 319 disposed on the first side 317 of the main pole 303. The first side gap 320 is disposed between the main pole 303 and the first side shield 319. The magnetic recording head 300 includes a second side gap 321 disposed on a second side 318 of the main pole 303, and a second side shield 322 disposed on the second side 318 of the main pole 303. The second side gap 321 is disposed between the main pole 303 and the second side shield 322. The magnetic recording head 300 also includes a leading side gap 323 disposed on the leading side 305 of the main pole 303. The leading side gap 323 is disposed between the main pole 303 and the leading shield 304. A hot seed layer 326 is disposed between the main pole 303 and the trailing shield 306.

The trailing side gap 308 includes a first section 324 between the first side shield 319 and the first side gap 320 (on one side of the first section 324) and the trailing shield 306 (on another side of the first section 324). The trailing side gap 308 includes a second section 316 between the main pole 303 and the hot seed layer 326. The trailing side gap 308 includes a third section 325 between the second side shield 322 and the second side gap 321 (on one side of the third section 325) and the trailing shield 306 (on another side of the third section 325). The trailing side gap 308 can extend between the first side shield 319 and the upper pole 302, and can extend between the second side shield 322 and the upper pole 302, as is shown in FIG. 3B.

The present disclosure contemplates that one or more of the second section 316, the first side gap 320, the second side gap 321, the leading side gap 323, the first section 324, and/or the third section 325 can be a gap.

The present disclosure contemplates that one or more of the second section 316, the first side gap 320, the second side gap 321, the leading side gap 323, the first section 324, and/or the third section 325 can be filled with one or more conductive layers that are nonmagnetic. Each of the one or more conductive layers is formed of one or more of ruthenium (Ru), chromium (Cr), tantalum (Ta), gold (Au), copper (Cu), nickel-chrome (NiCr), nickel-aluminum (NiAl), nickel-tantalum (NiTa), and/or nickel-iron-tantalum (NiFeTa).

The present disclosure contemplates that one or more of the second section 316, the first side gap 320, the second side gap 321, the leading side gap 323, the first section 324, and/or the third section 325 can be filled with one or more insulation layers. Each of the one or more insulation layers is formed of one or more of an aluminum oxide (AlO), a silicon nitride (SiN), and/or a tantalum nitride (TaN).

The second section 316 is of a width W1 along a cross-track direction that is about equal to a trailing width TW1 of the main pole 303 along the cross track direction. The width W1 can differ from the trailing width TW1. The width W1 and/or the trailing width TW1 can vary. The trailing side gap 308 is of a thickness T1 along a down-track direction. In one embodiment, which can be combined with other embodiments, the width W1 is within a range of 20 nm to 500 nm. In one embodiment, which can be combined with other embodiments, the thickness T1 is within a range of 10 nm to 100 nm, such as 40 nm. In one embodiment, which can be combined with other embodiments, the width W1 can be up to (such as equal to) a total width TOW1 that includes at least the width W1, a trailing width TW3 of the first side gap 320, and a trailing width TW4 of the second side gap 321.

Figure 4:
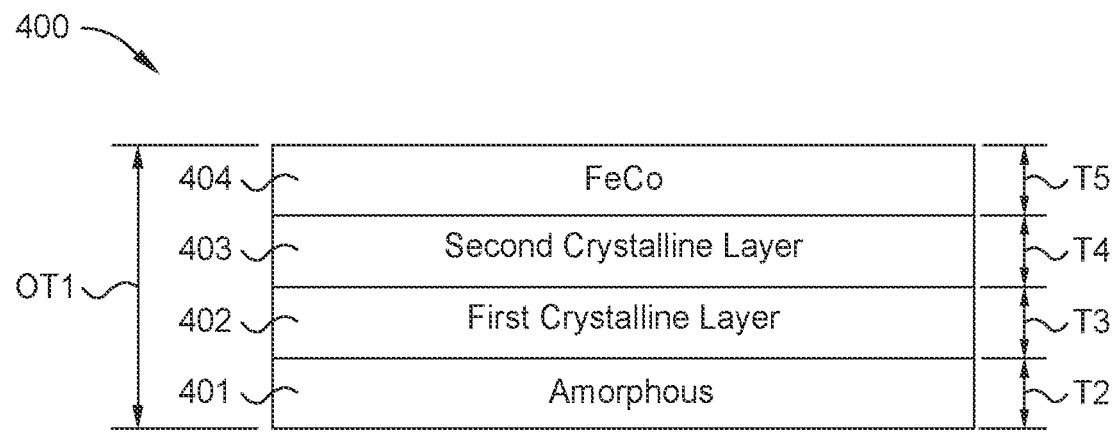
FIG. 4 is a schematic view of a multilayer structure, according to one implementation.

FIG. 4 is a schematic view of a multilayer structure 400, according to one implementation. The multilayer structure 400 is magnetic. The present disclosure contemplates that the multilayer structure 400 can be conductive or nonconductive.

The multilayer structure 400 includes an amorphous seed layer 401 and an iron-cobalt (FeCo) layer 404 that is ferromagnetic. The FeCo layer 404 includes an Fe atomic percentage within a range of 23% to 100%, and a Co atomic percentage within a range of 0% to 77%. In one or more embodiments, the Co atomic percentage is 75% or less, such as within a range of 65% to 75%. The present disclosure contemplates that the FeCo layer 404 can include one or more impurities (such as nickel (Ni) or nitrogen (N)) having an atomic percentage of 5% or less.

The amorphous seed layer 401 is metallic or ionic. In one embodiment, which can be combined with other embodiments, the amorphous seed layer 401 is formed of a metallic material that includes one or more of nickel (Ni), zirconium (Zr), tantalum (Ta), niobium (Nb), and/or iron (Fe). In one example, which can be combined with other examples, the metallic material includes one or more of nickel-zirconium (NiZr), nickel-tantalum (NiTa), nickel-niobium (NiNb), and/or nickel-tantalum-iron (NiTaFe). Other metallic materials are also contemplated for the amorphous seed layer 401. In one embodiment, which can be combined with other embodiments, the amorphous seed layer is formed of an ionic material that includes one or more of (Al), oxygen (O), and/or silicon (Si). In one example, which can be combined with other examples, the ionic material includes one or more of aluminum oxide ($Al_2O_3$) and/or silicon dioxide ($SiO_2$). Other ionic materials are also contemplated for the amorphous seed layer 401.

The FeCo layer 404 has a crystalline structure that is body-centered cubic (BCC). The crystalline structure of the FeCo layer 404 has an out-of-plane texture of <100> such that each grain of the FeCo layer 404 is oriented in the <100> out-of-plane axis direction (see FIGS. 5 and 6). The <100> texture is the crystallographic orientation of each grain within a mosaic spread about the <100> lattice direction. The <100> direction is an out-of-plane direction that extends normal to a film surface of the FeCo layer 404. The <100> direction of the grains is oriented perpendicularly to, for example, the (010) plane. Other textures, such as <110> and <111>, are contemplated for the FeCo layer 404. The <100> texture can facilitate targeted or localized magnetic switching while facilitating relatively low coercivity in a spatially pulsed drive field.

The multilayer structure 400 includes a first crystalline layer 402 between the amorphous seed layer 401 and the FeCo layer 404. The first crystalline layer 402 is formed of a first material. The first crystalline layer 402 is formed of an alloy.

The alloy includes one or more ruthenium (Ru), aluminum (Al), chromium (Cr), and/or molybdenum (Mo). Other alloy materials are also contemplated for the first crystalline layer 402. In one embodiment, which can be combined with other embodiments, the alloy is a ruthenium aluminide (RuAl) alloy having an Ru atomic percentage within a range of 48% to 58% and an Al atomic percentage within a range of 42% to 52%, such as within a range of 42% to 48%. In one example, which can be combined with other examples, the Al atomic percentage is 45%. In one embodiment, which can be combined with other embodiments, the alloy is a chromium-molybdenum (CrMo) alloy having an Mo atomic percentage within a range of 25% to 60% and a Cr atomic percentage within a range of 40% to 75%. In one or more embodiments, the Mo atomic percentage and the Cr atomic percentage added together equal 100. The first crystalline layer 402 has a crystalline structure that is ordered BCC (B2) and has a texture of <100>.

The multilayer structure 400 includes a second crystalline layer 403 between the first crystalline layer 402 and the FeCo layer 404. The second crystalline layer 403 is formed of a second material different from the first material. The second crystalline layer 403 interfaces both the FeCo layer 404 and the first crystalline layer 402 such that the second crystalline layer 403 contacts each of the FeCo layer 404 and the first crystalline layer 402. The second crystalline layer 403 has a crystalline structure that is body-centered cubic (BCC) and has a texture of <100>. Each of the first crystalline layer 402 and the second crystalline layer 403 is non-magnetic. In one or more embodiments, the second crystalline layer 403 is formed of chromium (Cr). In one or more embodiments, the second crystalline layer 403 is formed of an alloy that includes Cr and one or more other materials. In such an embodiment, a Cr atomic percentage is 85% or greater, and/or a total atomic percentage of the one or more other materials is 15% or less.

Other materials are contemplated for the second crystalline layer 403. In one embodiment, which can be combined with other embodiments, the second crystalline layer 403 includes one or more of chromium (Cr), manganese (Mn), iron (Fe), titanium (Ti), vanadium (V), cobalt (Co), nickel (Ni), copper (Cu), niobium (Nb), molybdenum (Mo), tungsten (W), rhenium (Re), and/or tantalum (Ta). The present disclosure contemplates that one or more other transition metals (such as any of the transition metals) may be used. The second crystalline layer 403 has a surface energy. In one embodiment, which can be combined with other embodiments, the surface energy is 2.25 J/m$^2$ or higher, such as 2.5 J/m$^2$ or higher. In one embodiment, which can be combined with other embodiments, the surface energy is 3.0 J/m$^2$ or higher. The Cr of the second crystalline layer 403 has a relatively high surface energy and beneficial adhesion properties. The relatively high surface energy facilitates lateral grain growth for the FeCo layer 404 over nucleation to reduce (e.g., minimize) surface energy of the FeCo layer 404. The Cr (compared to other materials) is relatively reactive and relatively easy to adhere (e.g., bond) to other materials (such as the first crystalline layer 402 and the FeCo layer 404), while having a relatively high surface energy to facilitate large lateral grain growth of the FeCo layer 404.

Other implementations are contemplated for the first crystalline layer 402, the second crystalline layer 403, and the FeCo layer 404. In one or more implementations, which can be combined with other implementations, each of the first crystalline layer 402, the second crystalline layer 403, and the FeCo layer 404 has a crystalline structure that is a cubic lattice structure. In one or more implementations, the crystalline structure is BCC. In one or more implementations, the crystalline structure is ordered BCC (such as B2). In one or more implementations, the crystalline structure is a super lattice cell that can include a plurality of BCC lattice sub-cells or ordered BCC lattice sub-cells (such as a super lattice cell that is DO3, C1B, L12, or CF16). Ordered BCC (B2) can be referred to as CsCl.

Each of the first crystalline layer 402, the second crystalline layer 403, and the FeCo layer 404 has a lattice parameter within a range of 2.85 to 3.15. In the implementation shown in FIG. 4, the second crystalline layer 403 is formed of chromium (Cr) and has a surface energy within a range of 3.0 J/m$^2$ to 3.2 J/m$^2$. The Cr of the second crystalline layer 403 facilitates easy and effective functioning and switching of the FeCo layer 404 under a spatially localized pulse field. Chromium (Cr) can particularly facilitate forming the FeCo layer 404 to facilitate lower coercivities and targeted magnetic switching under a localized drive field. The relatively high surface energy of the second crystalline layer 403 facilitates large grain growth for the FeCo layer 404.

The first crystalline layer 402 interfaces both the amorphous seed layer 401 and the second crystalline layer 403 such that the first crystalline layer 402 contacts each of the amorphous seed layer 401 and the second crystalline layer 403.

The amorphous seed layer 401 facilitates reduced interference of other structure underneath the amorphous seed layer 401 (such as structure of the magnetic recording head 300) with the formation (e.g., epitaxial growth) of the crystalline structures of the first crystalline layer 402, the second crystalline layer 403, and the FeCo layer 404.

The multilayer structure 400 includes an overall thickness OT1 made up of thicknesses T2-T5. The overall thickness OT1 is within a range of 190 Angstroms to 2,300 Angstroms. A first thickness T2 of the amorphous seed layer 401 is within a range of 30 Angstroms to 500 Angstroms. A second thickness T3 of the first crystalline layer 402 is within a range of 30 Angstroms to 100 Angstroms. A third thickness T4 of the second crystalline layer 403 is within a range of 30 Angstroms to 200 Angstroms. A fourth thickness T5 of the FeCo layer 404 is within a range of 100 Angstroms to 1500 Angstroms. The thicknesses OT1, T2, T3, T4, T5 facilitates effective layer functioning (such as the second thickness T3 for functioning of the first crystalline layer 402 and/or the third thickness T4 for functioning of the second crystalline layer 403). Other values are contemplated for the thicknesses OT1, T2, T3, T4, and/or T5. As an example, the present disclosure contemplates that the overall thickness OT1 can be within a range of 100 Angstroms to 1500 Angstroms.

The multilayer structure 400 can be part of one or more structures of magnetic recording heads, such as the magnetic recording head 300. In one embodiment, which can be combined with other embodiments, at least one of the main pole 303, the lower pole 301, the upper pole 302, or one or more shield structures (such as the side shield(s) 319, 322, the leading shield 304, and/or the trailing shield 306) includes the multilayer structure 400.

In the implementation shown in FIG. 3B, at least the trailing shield 306 includes the multilayer structure 400. The multilayer structure 400 facilitates targeted (e.g., localized) switching and lower coercivity. The multilayer structure 400 can be particularly beneficial when used as part of the trailing shield 306 because field intensity can be highest across the trailing shield 306 such that the energy needed to switch the field can be highest across the trailing shield 306.

In another embodiment, the present disclosure additionally contemplates, besides the example of FIG. 3B, that one or more of the amorphous seed layer 401, the first crystalline layer 402, and/or the second crystalline layer 403 can be at least part of the gap 316, and/or the FeCo layer 404 can be at least part of the hot seed layer 326.

Figure 5:
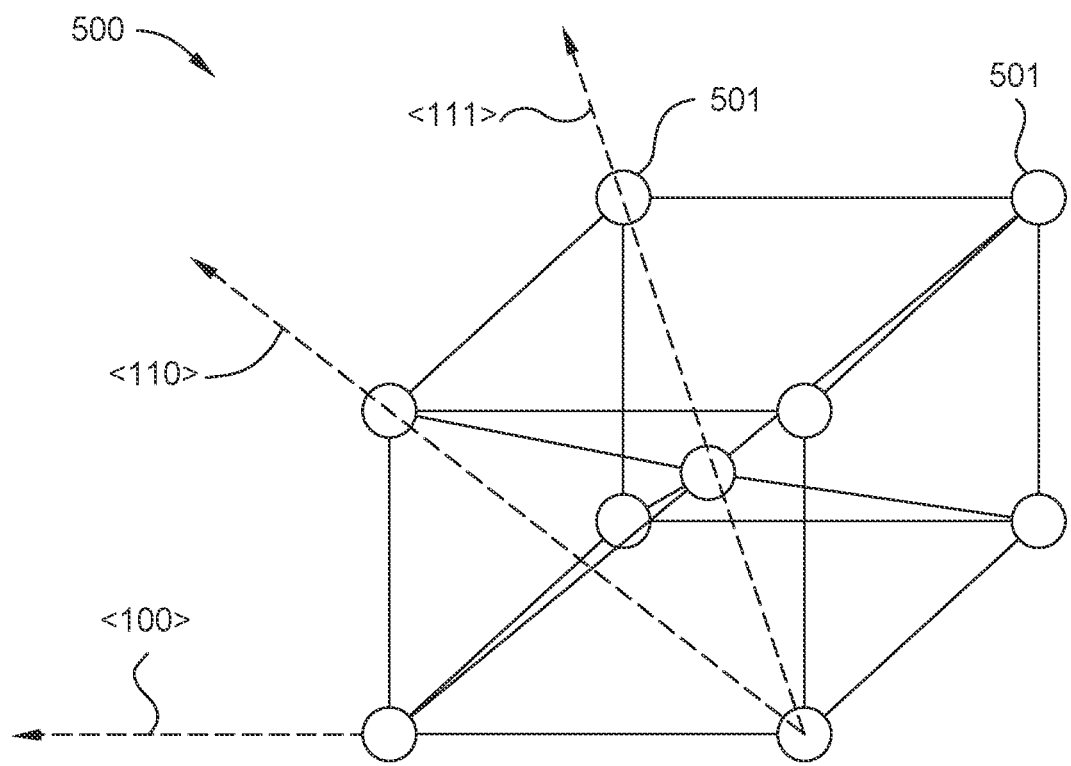
FIG. 5 is a schematic perspective view of a crystal structure of the FeCo layer shown in FIG. 4, according to one implementation.

FIG. 5 is a schematic perspective view of a crystal structure 500 of the FeCo layer 404 shown in FIG. 4, according to one implementation. The crystal structure 500 shows the BCC structure of atoms 501 of the FeCo layer 404. FIG. 5 shows a <100> direction, a <110> direction, and a <111> direction.

Figure 6:
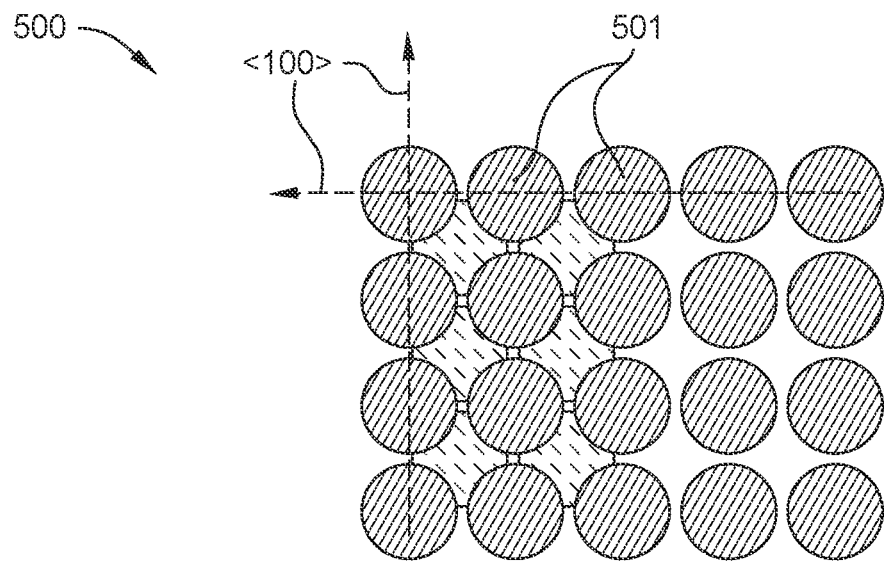
FIG. 6 is a schematic plane view of the crystal structure of the FeCo layer shown in FIG. 4 taken along the (100) plane, according to one implementation.

FIG. 6 is a schematic plane view of the crystal structure 500 of the FeCo layer 404 shown in FIG. 4 taken along the (100) plane, according to one implementation.

Figure 7:
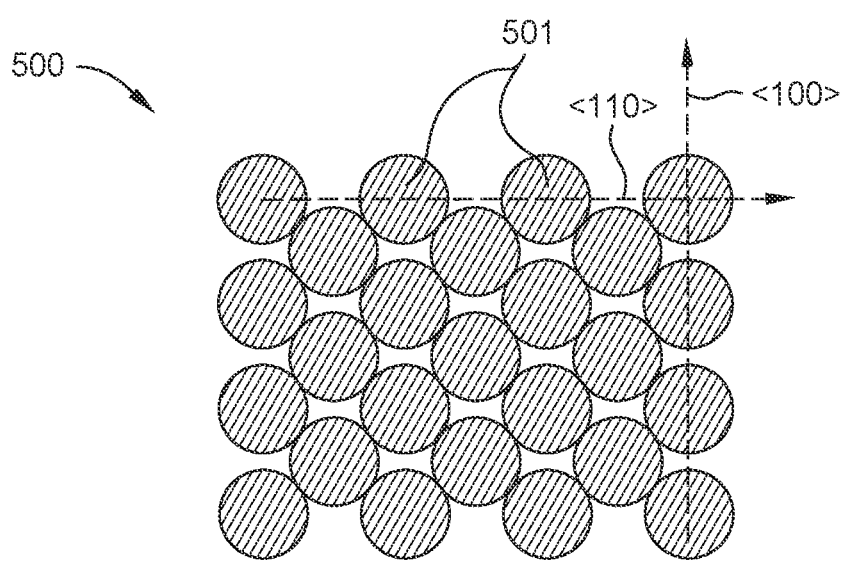
FIG. 7 is a schematic plane view of the crystal structure of the FeCo layer shown in FIG. 4 taken along the (110) plane, according to one implementation.

FIG. 7 is a schematic plane view of the crystal structure 500 of the FeCo layer 404 shown in FIG. 4 taken along the (110) plane, according to one implementation.

Magnetic switching along the <100> direction consumes less energy than magnetic switching along the <110> direction, and magnetic switching along the <110> direction consumes less energy than magnetic switching along the <111> direction.

Figure 8:
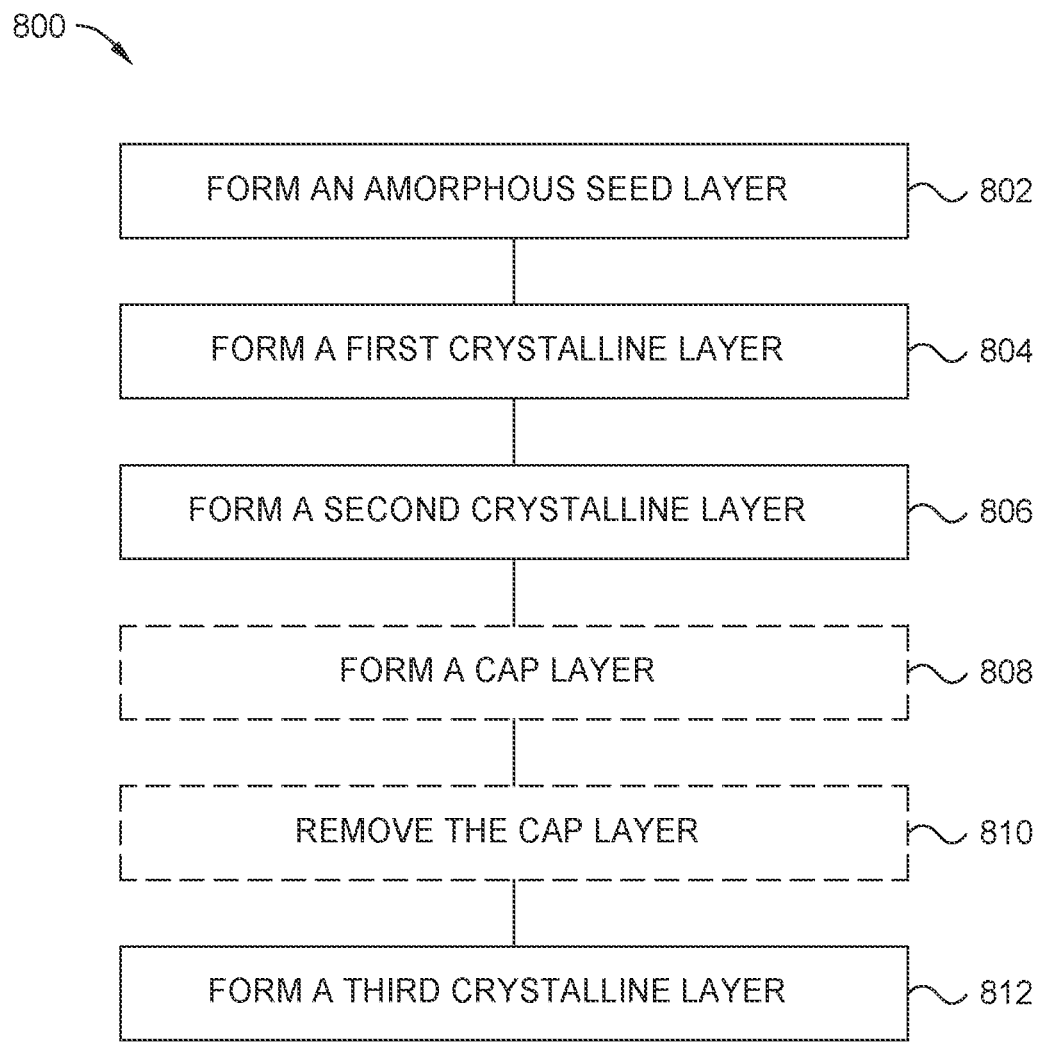
FIG. 8 is a schematic block diagram view of a method of making the multilayer structure, according to one implementation.

FIG. 8 is a schematic block diagram view of a method 800 of making the multilayer structure 400, according to one implementation.

Operation 802 includes forming the amorphous seed layer 401.

Operation 804 includes forming the first crystalline layer 402 on the amorphous seed layer 401.

Operation 806 includes forming the second crystalline layer 403 on the first crystalline layer 402.

Optional operation 808 includes forming a cap layer on the second crystalline layer 403. In one or more embodiments, the cap layer is formed of ruthenium (Ru). Other materials are contemplated for the cap layer.

Optional operation 810 includes removing the cap layer.

Operation 812 includes forming a third crystalline layer (e.g., the FeCo layer 404) on the second crystalline layer 403. In implementations where optional operations 808, 810 are used, the second crystalline layer 403 is exposed as a result of the removal of the cap layer.

In one or more embodiments, optional operations 808, 810 are not included in the method 800 if the amorphous seed layer, the first crystalline layer, the second crystalline layer, and the third crystalline layer can be formed in-situ without breaking vacuum in a continuous process. In one or more embodiments, optional operations 808, 810 are included in the method 800 if one or more layers (such as the third crystalline layer) is formed ex-situ (e.g., breaking vacuum).

The formation of layers of operations 802, 804, 806, and 808 can be conducted in-situ in the same first processing chamber. The removal operation 810 can be conducted in-situ with the formation of operation 812 in the same first processing chamber. The formation of layers of operations 802, 804, 806, and 812 can be conducted in-situ in the same first processing chamber, and optional operations 808, 810 can be omitted. In one embodiment, which can be combined with other embodiments, the formation of operations 802, 804, 806, 808, and 812 each includes epitaxially growing the respective layers. Other formation methods are contemplated.

Each operation 802, 808, 806, 808, and/or 812 can include pre-etching prior to the formation of the respective layer. The pre-etching etches the surface upon which the respective layer is subsequently formed to facilitate adhesion of the respective layer to the etched surface. As an example, an exposed surface of the second crystalline layer is etched prior to the formation of the third crystalline layer in operation 812.

FIG. 9A is a schematic grain view of a plurality of grains 901 of a layer, according to one implementation. A localized magnetic field 910 is applied to a first grain 901a and part of the surrounding grains (such as 901b, 901c, etc.).

FIG. 9B is a schematic graphical view of a gradient 920 of the localized magnetic field 910 applied in FIG. 9A, according to one implementation. The gradient 920 represents a single pulse of magnetic energy. The gradient 920 shows amplitude of the pulse (vertically) relative to distance (horizontally).

As shown in FIG. 9B, the gradient 920 is steep to facilitate efficient (e.g., low energy expenditure) and effective magnetic switching. As shown in FIG. 9A, the localized magnetic field 910 switches not only the magnetization of the first grain 901a but also the magnetizations of neighboring grains (such as two grains 901b, 901c, and the rest of grains shown outside of the spatial pulse 920 in FIG. 9A). The perturbation outside of the localized pulse is from intergranular ferromagnetic exchange coupling. The unintentional switching of neighboring grains makes it difficult to conduct targeted magnetic switching of single grains.

Each of the grains 901 has a grain size D1. The mean grain size D1 across the plurality of grains 901 is less than the critical exchange couple length, which in one instance is believed to be on the order of 18 nm. The grain size D1 shown refers to the mean side-to-side diameter of the grains 901.

FIG. 10A is a schematic grain view of a plurality of grains 1001 of the FeCo layer 404 shown in FIG. 4, due to exchange coupling, according to one implementation. The same localized magnetic field 910 applied in FIG. 9A is applied to a single grain 1001a in FIG. 10A, and the grain 1001a has a grain size larger than the critical ferromagnetic exchange coupling length, so the single grain 1001a can switch without perturbing neighboring grains.

FIG. 10B is a schematic graphical view of the same gradient 920 of the localized magnetic field 910 shown in FIG. 9B, according to one implementation.

Using the same localized magnetic field 910 having the same gradient 920, a targeted magnetic switching of the single grain 1001a is accomplished, as shown in FIG. 10A. Neighboring grains (such as two grains 1001b, 1001c) are not magnetically switched.

Each of the grains 1001 has a grain size D2. The mean grain size D2 across the plurality of grains 901 is 18 nm or higher. In one embodiment, which can be combined with other embodiments, the mean grain size D2 is 18 nm or higher, such as 20.0 nm or higher. Using the grain size D2, grains 1001 are less effected by the magnetizations of neighboring grains compared to the grains 901 shown in FIG. 9A due to lack of intergranular ferromagnetic exchange coupling.

FIG. 11 is a schematic graphical view of a graph 1100 showing energy needed to magnetically switch individual grains of the plurality of grains 901 shown in FIG. 9A under a uniform field, according to one implementation. The graph 1100 shows the energy barriers for switching various grains.

An energy barrier profile 1101 of a first grain shows a first energy level 1102 of the first grain. The peak of the profile 1101 represents the energy barrier for switching the first grain. An energy barrier profile 1105 of a second grain shows a second energy level 1104 of the second grain. An energy barrier profile 1107 of an $N^{th}$ grain shows a third energy level 1106 of the $N^{th}$ grain.

Due to the relatively small grain size, the ferromagnetic coupling effects among grains are relatively high. When grain size is small and grains are ferromagnetically exchange coupled, aggregates of grains are aligned due to ferromagnetic exchange coupling, and magnetic domain is larger than grain size. As a first energy barrier 1102, a second energy barrier 1104, and a third energy barrier 1106 show, the energy states of individual randomly oriented grains may not be the lowest at the bottoms of the energy wells.

FIG. 12 is a schematic graphical view of a graph 1200 showing energy needed to magnetically switch individual decoupled grains of the plurality of grains 1001 shown in FIG. 10A under a uniform field, according to one implementation. The graph 1200 shows the energy barriers for switching various grains. An energy barrier profile 1201 of a first grain shows a first energy level 1202 of the first grain. The peak of the profile 1201 represents the energy barrier for switching the first grain. An energy barrier profile 1205 of a second grain shows a second energy level 1204 of the second grain. An energy barrier profile 1207 of an N$^{th}$ grain shows a third energy level 1106 of the N$^{th}$ grain.

When grain size is large and grains are not ferromagnetically exchange coupled (as shown in FIG. 12), aggregates of grains are not pre-aligned due to ferromagnetic exchange coupling, and individual grains are sitting in the bottom of respective energy wells as shown in FIG. 12 at the first energy level 1202, the second energy level 1204, and the third energy level 1206.

When a uniform field is applied to switch grains, the sum of total energy spent from the energy levels 1102, 1104, 1106 of FIG. 11 will be much less than that from the energy levels 1202, 1204, 1206 of FIG. 12.

This means the coercivity as tested from a film coupon from a tester with uniform field (e.g., a BH Looper and VSM) can provide opposite results compared to results from a magnetic recording head with pulsed field. That is, testing may incorrectly indicate that crystalline with hard intrinsic coercivity may switch more freely than small grain film. Hence, it would be more desirable if FeCo intrinsic magnetization responses can be improved. For example, the functionality of the FeCo layer 404 (shown in FIG. 4) with large grains (e.g., in FIG. 10A) may be improved under localized excitation, such as in a recording head.

Because of exchange coupling of grains, the various grains of the plurality of grains 901 tend to switch in tandem at different applied energies and/or different times. Targeted switching can be difficult because an energy applied to the N$^{th}$ grain may unintentionally switch the first grain and the second grain, and vice-versa. Hence, targeted magnetic switching of a targeted single grain or a targeted plurality of grains can be difficult to achieve using the grains 901.

Figure 13:
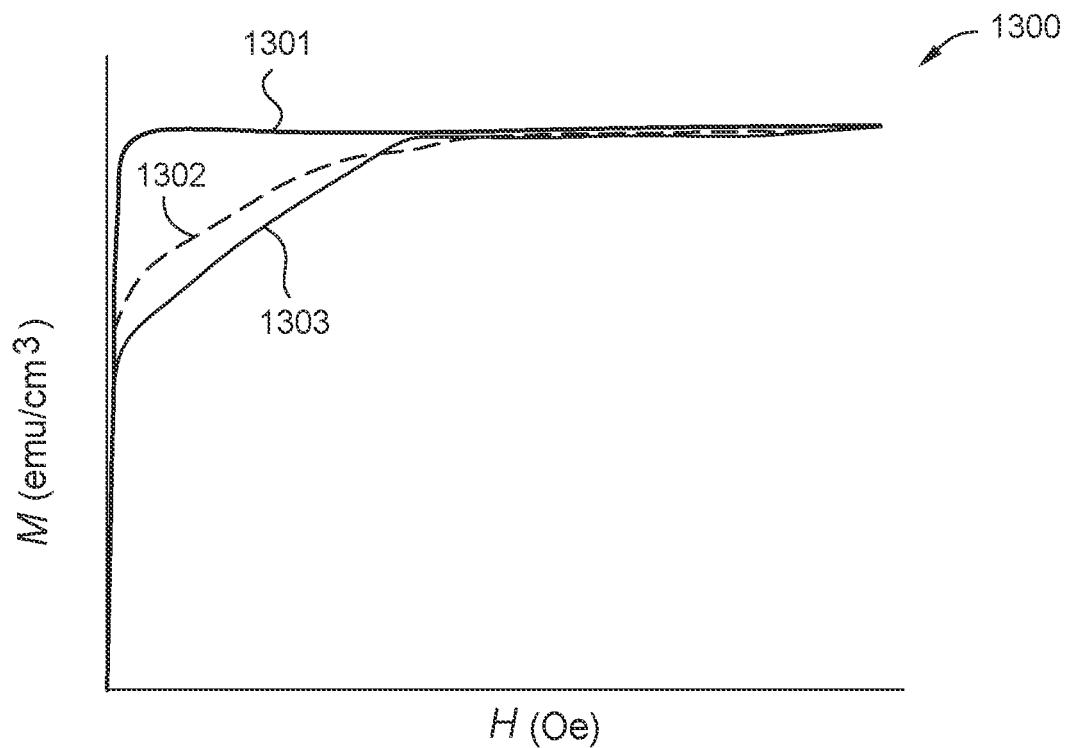
FIG. 13 is a graphical view of a graph showing magnetocrystalline anisotropy of a BCC crystalline structure, according to one implementation.

As shown by the energy levels 1202, 1204, 1206, the various grains of the plurality of grains 1001 are decoupled and switch individually at substantially the same applied energy and time. Hence, targeted magnetic switching of a targeted single grain or a targeted plurality of grains can be facilitated using the grains 1001 of the FeCo layer 404 of the multilayer structure 400. FIG. 13 is a schematic graphical view of a graph 1300 showing magnetocrystalline anisotropy of a BCC crystalline structure, according to one implementation. The vertical axis plots the magnetization moment (in emu/cm$^3$) of each orientation. The horizontal axis plots applied field. The saturation field correlates to corresponding coercivity (in Oe).

A first profile 1301 shows the magnetic saturation along <100> orientation.

A second profile 1302 shows the magnetic saturation along <110> orientation.

A third profile 1303 shows the magnetic saturation along <111> orientation.

As shown by the first profile 1301, the <100> orientation is the easiest magnetization axis. That is, when there is a <100> texture there are more in-plane easy orientation axes <100> (in FIG. 6 there are two perpendicular in-plane <100> axes shown) as opposed to other textures (such as <110>, which is shown in FIG. 7 with one in-plane <100> axis). The <100> texture for the FeCo layer 404 facilitates more degrees of freedom to switch during writing operations, and particularly a higher moment at lower coercivities. The more degrees of freedom facilitate a lower electromagnetic energy needed to switch grains, which facilitates more effective magnetic switching, resulting in higher areal density drive capacity with sharper transition and less driving field (see, for example, FIGS. 17 and 18).

The crystallographic plane with the most in-plane <100> easy axes is the (100) plane having two orthogonal <100> easy axes as shown FIG. 6. That is, a <100> orientation texture has the most degrees of freedom for magnetizations to facilitate easy switching. Other planes such as (110) have, for example, only one <100> easy axis is in-plane as shown in FIG. 7.

The amorphous seed layer 401 facilitates formation of the first crystalline layer 402 and the second crystalline layer 403. The first crystalline layer 402 facilitates the <100> texture (having grains in the <100> direction) for the second crystalline layer 403 and the FeCo layer 404. The second crystalline layer 403 facilitates lateral grain growth (e.g., relatively large grains) of the FeCo layer 404 to facilitate achieving localized easy switching for the FeCo layer 404.

The information shown in FIG. 13 can be obtained from Robert C. O'Handley, "Modern Magnetic Materials, Principles and Applications," Pages 179-183.

Figure 14:
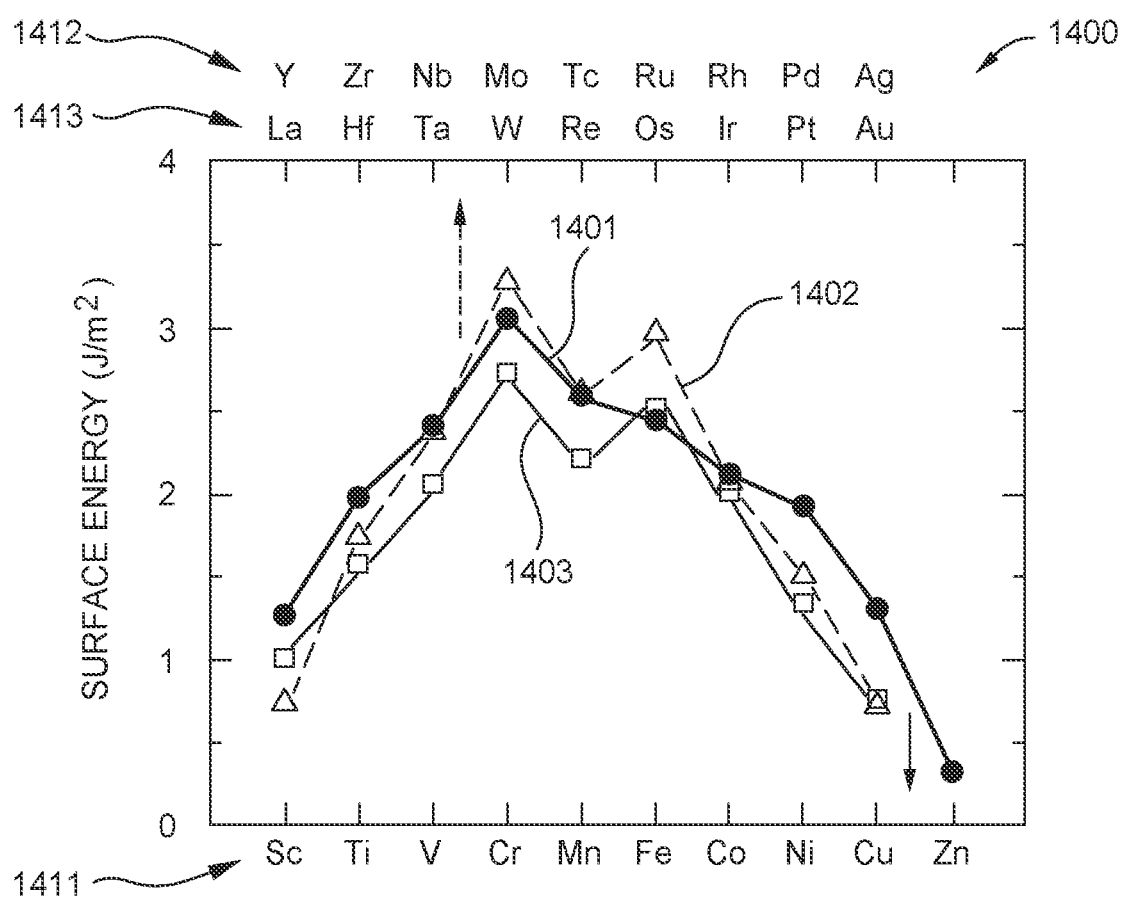
FIG. 14 is a schematic graphical view of a graph showing surface energies of various materials, according to one implementation.

FIG. 14 is a schematic graphical view of a graph 1400 showing surface energies of various materials, according to one implementation. The vertical axis plots the surface energy.

A first profile 1401 (having solid circles) plots the surface energies of the elements shown in a row 1411 adjacent the bottom horizontal axis.

A second profile 1402 (having hollow triangles) plots the surface energies of the elements shown in a first row 1412 adjacent the top horizontal axis.

A first profile 1403 (having hollow squares) plots the surface energies of the elements shown in a second row 1413 adjacent the top horizontal axis. The second row 1413 of elements is below the first row 1412 of elements.

The surface energy of each element is determined by finding the value that vertically aligns with the element in the graph 1400 along the respective profile 1401, 1402, or 1403.

The information shown in FIG. 14 can be obtained from M. P. J. Punkkinen, et al., "Surface properties of 3d transition metals," 2011, Philosophical Magazine, 91:27, Pages 3627-3640.

As discussed above, Cr has a relatively high surface energy (which facilitates large lateral grain growth) and beneficial adhesion and oxidation properties.

FIGS. 15A and 15B are schematic table views of tables showing testing data of FeCo layers for various implementations.

FIG. 15A shows an easy axis coercivity "Hce," an easy axis squareness "Sqre," a hard axis coercivity "Hch," and a hard axis squareness "Sqrh," and a texture for each of five implementations.

FIG. 15B shows a FeCo layer thickness (in Angstroms), a grain size (in Angstroms), and the texture for four of the five implementations.

"Implementation(s) 1-4" involves various implementations of the method 800 shown in FIG. 8.

"Implementation 1" involves the multilayer structure 400 where the removal of a cap layer is ex-situ relative to the formation of the FeCo layer 404, the first crystalline layer 402 is formed of a ruthenium aluminide (RuAl) alloy and has a <100> texture, the second crystalline layer 403 is formed of chromium (Cr) and is oxidized after formation, and the FeCo layer 404 is formed ex-situ.

"Implementation 2" involves the multilayer structure 400 where the removal of a cap layer is in-situ with FeCo layer 404 deposition, the first crystalline layer 402 is formed of a ruthenium aluminide (RuAl) alloy and has a <100> texture, the second crystalline layer 403 is formed of chromium (Cr) and is not oxidized, and the FeCo layer 404 is formed in-situ.

"Implementation 3" involves the multilayer structure 400 where all of the layers 401, 402, and 403 are omitted, and the FeCo layer 404 is formed on an $SiO_2$ substrate (including thermally oxidized Si).

"Implementation 4" involves the multilayer structure 400 where the second crystalline layer 403 is formed of chromium (Cr) and has a <110> texture, and the FeCo layer 404 is formed in-situ.

"Implementation 5" involves a FeCo layer formed on nickel-chrome (NiCr) where FeCo is detected to have smaller grains 901, as this FeCo layer is additionally formed of nickel-chrome (NiCr) in addition to iron-cobalt (FeCo), and the FeCo layer is formed in-situ.

As can be seen by comparing FIGS. 15A and 15B, implementations such as "Implementation 1" and "Implementation 2" facilitate large grain sizes and <100> textures, and show significant reduction in hard axis coercivity and reduction of hard axis squareness as compare to Implementation 3 and 4. The data in FIGS. 15A and 15B was obtained from BH Looper measurements. The hard axis coercivity of Implementations 1 and 2 is relatively close to that of Implementation 5, which is induced by small grain intergranular ferromagnetic exchange coupling.

Figure 16:
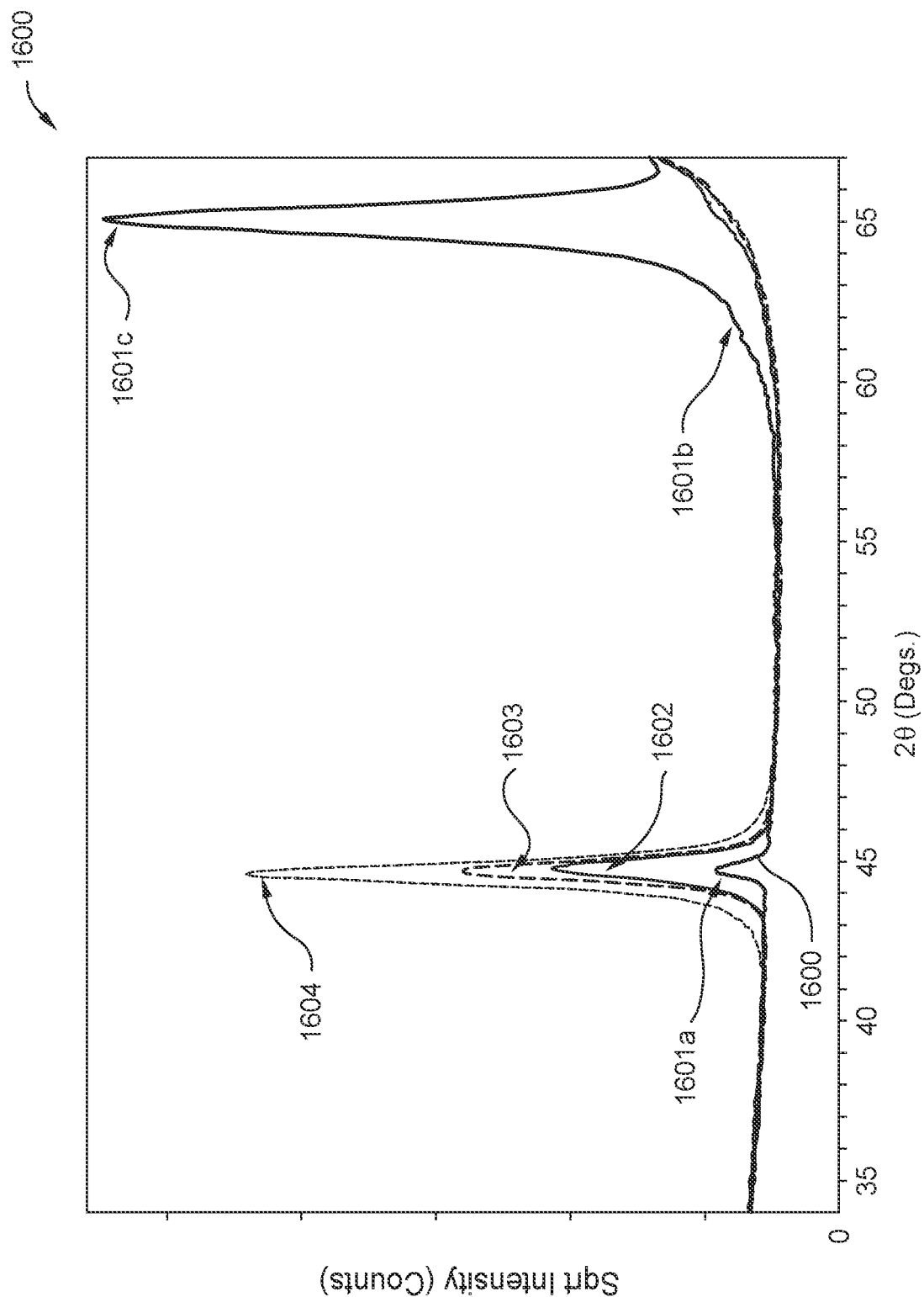
FIG. 16 is a schematic graphical view of a graph showing X-Ray Powder Diffraction (XRD) testing results.

FIG. 16 is a schematic graphical view of a graph 1600 showing out-of-Plane X-Ray Powder Diffraction (XRD) testing results. Various implementations are shown in FIG. 16. The vertical axis plots the square root of the intensity (in counts) of the number of grains having the texture of the respective profile. The horizontal axis plots double the angle of diffraction (in degrees). Each of the profiles shown in the graph 1600 is shown in a logarithmic scale.

A first profile 1601 has a first section 1601a that corresponds to iron-cobalt (FeCo) having greatly reduced <110> diffraction intensity facilitated by the <100> texture, a second section 1601b that corresponds to the ruthenium aluminide (RuAl) alloy having a texture of <200> (shown by measured diffraction), and a third section 1601c that corresponds to the FeCo material having a texture of <200>. All three sections 1601a, 1601b, 1601c indicate the <100> texture.

A second profile 1602, a third profile 1603, and a fourth profile 1604 each corresponds to iron-cobalt (CoFe) having no marginally detectable <200> diffraction and an increasing <110> intensity, consistent with a texture of <110>.

The first profile 1601 corresponds to the multilayer structure 400.

The second profile 1602 corresponds to "Implementation 4" shown in FIGS. 15A and 15B.

The third profile 1603 corresponds to "Implementation 3" shown in FIGS. 15A and 15B.

The fourth profile 1604 corresponds to "Implementation 5" shown in FIGS. 15A and 15B.

Figure 17:
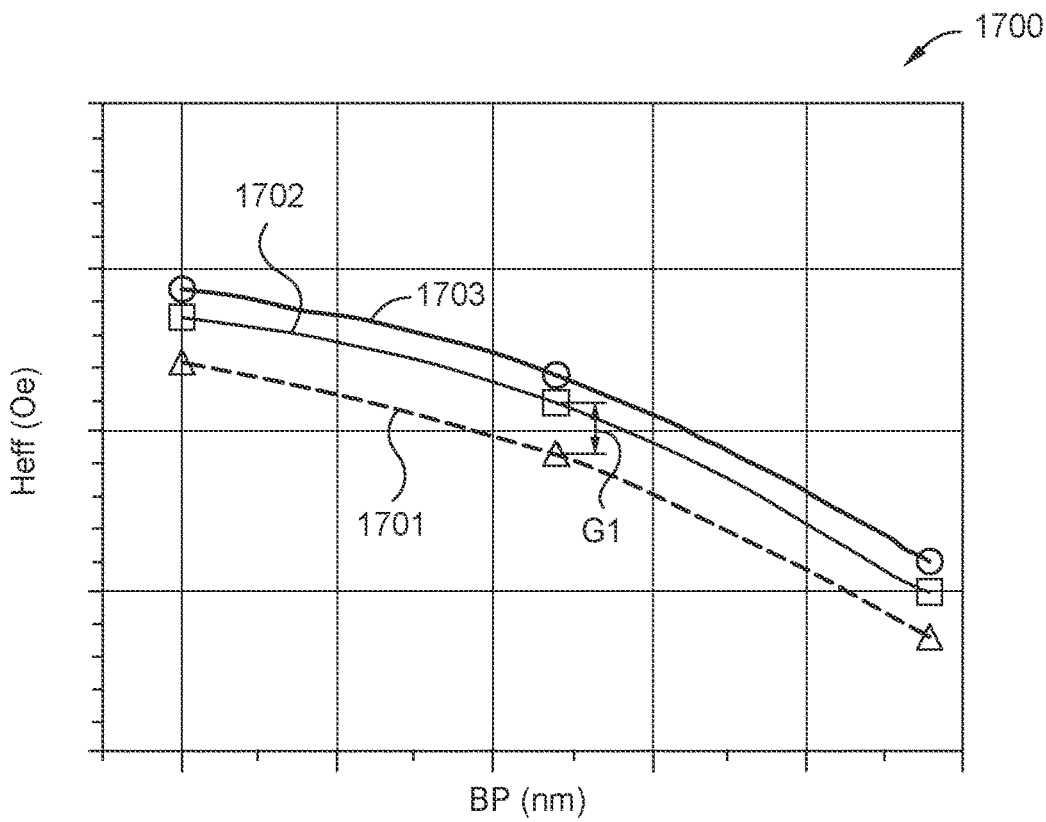
FIG. 17 is a Finite Element Modeling result of an actual write head as presented in a graph 1700 showing effective write field (Heff) at different Hot Seed permeabilities (200, 400, 600), according to one implementation.

FIG. 17 is a Finite Element Modeling result of an actual write head as presented in a graph 1700 showing effective write field (Heff) at different Hot Seed permeabilities (200, 400, 600), according to one implementation. The horizontal axis of the graph 1700 is the bump position (in nm). The higher the permeability, the softer the FeCo film, and the lower the Hch. Profiles 1701 1702, 1703 show FeCo film with permeabilities of 200, 400, 600 respectively. By using the multilayer structure 400, the permeability of the trailing shield 306 and/or the hot seed layer 326 would increase, and the Heff would increase.

The increase of permeability from 200 to 400 raises the profile from 1701 to 1702, facilitating a gain G1 in overwrite performance. The gain G1 is 0.15 dB or higher.

Figure 18:
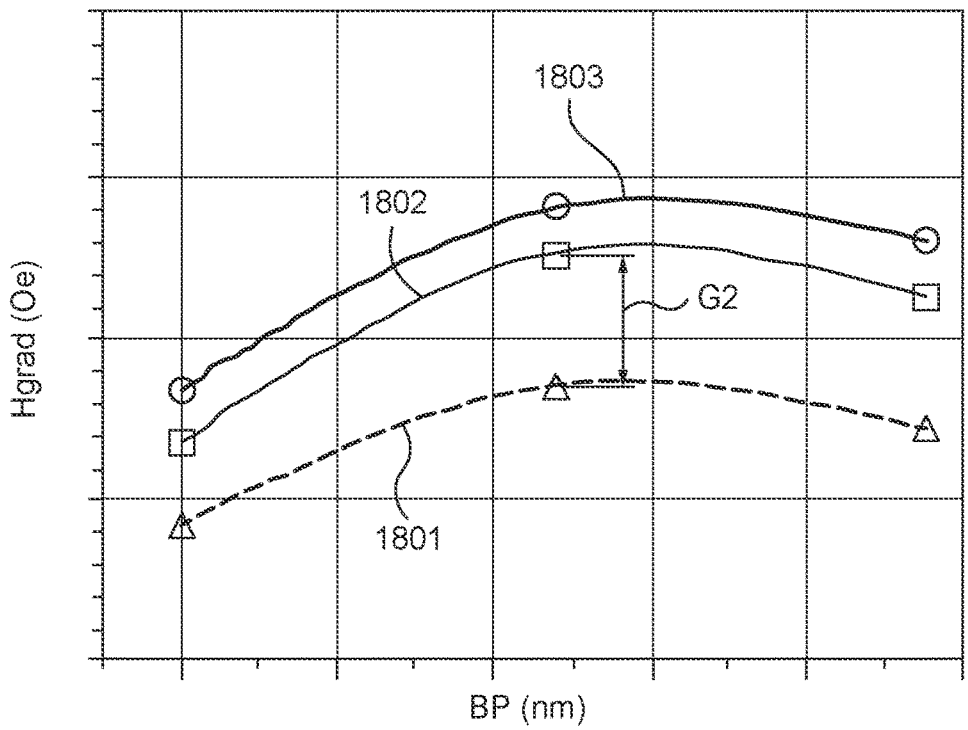
FIG. 18 is a Finite Element Modeling result of an actual write head as presented in a graph 1800, according to one implementation.

FIG. 18 is a Finite Element Modeling result of an actual write head as presented in a graph 1800, according to one implementation. The graph 1800 shows an effective write field gradient (Hgrad) at different Hot Seed permeabilities (200, 400, 600, respectively). The higher the permeability, the softer the FeCo film, and the lower the Hch. Profiles 1801 1802, 1803 are FeCo film with permeabilities of 200, 400, 600 respectively. As the permeability of the trailing shield 306 and/or the hot seed layer 326 increases, the Hgrad increases.

The increase of permeability from 200 to 400 raises the profile from 1801 to 1802, facilitating a gain G2 in linear density of 0.5% or higher (e.g., in bits per inch).

Using the multilayer structure 400, the permeability of the trailing shield 306 and/or the hot seed layer 326 would increase compared to other operations. Additionally, using the multilayer structure 400, increased hot seed permeability reduces magnetic leakage to the side shields 319 and 322 that can cause cross track interference and performance degradation. The multilayer structure 400 facilitates reduced performance degradation (such as degradation of the trailing shield 306 and/or the hot seed layer 326). The degradation is reduced compared leakage that can cause magnetic migration toward the side shields 319, 322, which can cause magnetic saturation at edges 381, 382 (shown in FIG. 3B) of the side shields 319, 322. The otherwise degraded performance of the trailing shield 306 and/or the hot seed layer 326 could cause an increase in unshielded magnetic field in the area corresponding to the trailing shield 306 and/or the hot seed layer 326, which would hinder writing operations.

Additionally, magnetic leakage can cause more magnetic field to be shielded in areas where the magnetic field is less strong (such as in areas corresponding to the side shields 319, 322), which can hinder writing operations.

The present disclosure utilizes localized magnetic switching with reduced individual grain coercivities under high magnetic field gradients. Benefits include enhanced writing efficiencies; simplicity; reliability; enhanced overwrite performance; increased linear density and recording density; enhanced reliability by potentially reducing pole erasure from high remanence fields; reduced cross track interference from stray field due to un-saturated and/or under-saturated shield; reduced shield performance degradation; less shield field leakage from shield structures (such as for a trailing shield); using soft shield materials for shield structures; and operational efficiencies. Moreover, certain thin film tests with uniform applied magnetic fields are incapable of resolving the differences between the structures disclosed herein and certain other microstructures such as small grains with "softer magnetic properties," because both have small coercivity and are magnetically anisotropic. It is under a spatially pulsed magnetic field at the device level during writing operations where the small grain structures with intergranular coupling magnetically drag neighboring and otherwise undisturbed grains along, making switching sluggish and less responsive. Additionally, such an effect from ferromagnetic exchange coupling is undiscoverable during film development and during selection from tests that use uniform fields. A drive test may be used but can be expensive, impractical, and/or time-consuming (such as by taking six months or longer for development cycle times). By mitigating such effects, the present disclosure saves development costs and development cycle times, and facilitates cost effectiveness.

As an example, reduced coercivity in a trailing shield and/or hot seed facilitates increased permeability and reduced or eliminated magnetic leakage that can degrade shield performance. As another example, reduced coercivity facilitates increased areal density capability (ADC). As another example, reduced coercivity facilitates using recording media (e.g., disks) that have lower coercivities, which facilitates lower write signals and reduced power inputs for writing to facilitate enhanced thermal reliability of magnetic recording devices. The aspects described herein can facilitate the benefits described by, for example, reducing shield leakage to enhance shield performance.

The facilitated large grain sizes with reduced coercivities increases the modularity of certain components (such as the trailing shield 306 and material(s) used) for use with modern HDD's that facilitate high recording density and use of pulsed writing signals.

It is contemplated that one or more aspects disclosed herein may be combined. Moreover, it is contemplated that one or more aspects disclosed herein may include some or all of the aforementioned benefits. As an example, one or more of the aspects, components, features, operations, and/or properties of the magnetic recording head 300, the multilayer structure 400, the crystal structure 500, the method 800, the grains 1001, the graph 1200, the graph 1300, the graph 1400, the tables of FIGS. 15A and 15B, the graph 1600, the graph 1700, and/or the graph 1800 may be combined for a magnetic recording head (such as a write head of an HDD).

In one implementation, a magnetic recording head includes an iron-cobalt (FeCo) layer having a crystalline structure that is a cubic lattice structure, a first crystalline layer formed of a first material; and a second crystalline layer between the first crystalline layer and the FeCo layer. The second crystalline layer is formed of a second material different from the first material, and the second crystalline layer interfaces both the FeCo layer and the first crystalline layer. The crystalline structure of the FeCo layer is body-centered cubic and has a texture of <100>. The FeCo layer includes a plurality of grains having a mean grain size of 18 nm or higher. The second crystalline layer has a surface energy that is 2.25 $J/m^2$ or higher. The second crystalline layer includes chromium (Cr) at a Cr atomic percentage of 85% or greater. The second crystalline layer has a crystalline structure that is body-centered cubic (BCC) and has a texture of <100>. The first crystalline layer is formed of an alloy including one or more ruthenium (Ru), aluminum (Al), chromium (Cr), or molybdenum (Mo). In one or more embodiments, the alloy is a ruthenium aluminide (RuAl) alloy having an Ru atomic percentage within a range of 48% to 58% and an Al atomic percentage within a range of 42% to 48%. In one or more embodiments, the alloy is a chromium-molybdenum (CrMo) alloy having an Mo atomic percentage within a range of 25% to 60% and a Cr atomic percentage within a range of 40% to 75%. The first crystalline layer has a crystalline structure that is ordered BCC (B2) and has a texture of <100>. The magnetic recording head includes an amorphous seed layer. The first crystalline layer is between the amorphous seed layer and the FeCo layer. The amorphous seed layer is metallic or ionic. In one or more embodiments, the amorphous seed layer is formed of a metallic material that includes one or more of nickel (Ni), zirconium (Zr), tantalum (Ta), niobium (Nb), or iron (Fe). In one or more embodiments, the amorphous seed layer is formed of an ionic material that includes one or more of (Al), oxygen (O), or silicon (Si). A magnetic recording device having the magnetic recording head is also disclosed.

In one implementation, a magnetic recording head includes a lower pole, an upper pole, a main pole between the upper pole and the lower pole, and one or more shield structures between the upper pole and the main pole. At least one of the main pole, the lower pole, the upper pole, or the one or more shield structures includes a multilayer structure. The multilayer structure includes an iron-cobalt (FeCo) layer having a crystalline structure that is a cubic lattice structure. In one or more embodiments, the one or more shield structures include a trailing shield, and the trailing shield includes the multilayer structure. The multilayer structure also includes an amorphous seed layer and a first crystalline layer between the amorphous seed layer and the FeCo layer. The first crystalline layer is formed of a first material. The multilayer structure also includes a second crystalline layer between the first crystalline layer and the FeCo layer. The second crystalline layer is formed of a second material different from the first material, and the second crystalline layer interfaces both the FeCo layer and the first crystalline layer. The crystalline structure of the FeCo layer is body-centered cubic (BCC) and has a texture of <100>, the first crystalline layer is formed of an alloy, and the second crystalline layer includes chromium (Cr) at a Cr atomic percentage of 85% or greater.

In one implementation, a magnetic recording head includes a ferromagnetic layer. The magnetic recording head includes a first crystalline layer formed of a first material, and a second crystalline layer between the first crystalline layer and the ferromagnetic layer. The second crystalline layer is formed of a second material different from the first material, and the second crystalline layer interfaces both the ferromagnetic layer and the first crystalline layer.

While the foregoing is directed to embodiments of the present disclosure, other and further embodiments of the disclosure may be devised without departing from the basic scope thereof, and the scope thereof is determined by the claims that follow.

What is claimed is:

1. A magnetic recording head, comprising:
   an iron-cobalt (FeCo) layer having a crystalline structure that is a cubic lattice structure;
   a first crystalline layer formed of a first material;
   a second crystalline layer between the first crystalline layer and the FeCo layer, the second crystalline layer formed of a second material different from the first material, and the second crystalline layer interfacing both the FeCo layer and the first crystalline layer; and
   an amorphous seed layer, wherein the first crystalline layer is between the amorphous seed layer and the second crystalline layer.

2. The magnetic recording head of claim 1, wherein the crystalline structure of the FeCo layer is body-centered cubic (BCC) and has a texture of <100>.

3. The magnetic recording head of claim 2, wherein the FeCo layer comprises a plurality of grains having a mean grain size of 18 nm or higher.

4. The magnetic recording head of claim 2, wherein the second crystalline layer has a surface energy that is 2.25 J/m2 or higher.

5. The magnetic recording head of claim 2, wherein the second crystalline layer includes chromium (Cr) at a Cr atomic percentage that is 85% or greater.

6. The magnetic recording head of claim 5, wherein the second crystalline layer has a crystalline structure that is body-centered cubic (BCC) and has a texture of <100>.

7. The magnetic recording head of claim 1, wherein the first crystalline layer is formed of an alloy including one or more ruthenium (Ru), aluminum (Al), chromium (Cr), or molybdenum (Mo).

8. The magnetic recording head of claim 7, wherein the alloy is a ruthenium aluminide (RuAl) alloy having an Ru atomic percentage within a range of 48% to 58% and an Al atomic percentage within a range of 42% to 52%.

9. The magnetic recording head of claim 7, wherein the alloy is a chromium-molybdenum (CrMo) alloy having an Mo atomic percentage within a range of 25% to 60% and a Cr atomic percentage within a range of 40% to 75%.

10. The magnetic recording head of claim 7, wherein the first crystalline layer has a crystalline structure that is ordered BCC (B2) and has a texture of <100>.

11. The magnetic recording head of claim 1, wherein the amorphous seed layer is metallic or ionic.

12. The magnetic recording head of claim 11, wherein the amorphous seed layer is formed of a metallic material that includes one or more of nickel (Ni), zirconium (Zr), tantalum (Ta), niobium (Nb), or iron (Fe).

13. The magnetic recording head of claim 11, wherein the amorphous seed layer is formed of an ionic material that includes one or more of (Al), oxygen (O), or silicon (Si).

14. A magnetic recording device comprising the magnetic recording head of claim 1.

15. A magnetic recording head, comprising:
an iron-cobalt (FeCo) layer having a crystalline structure that is a cubic lattice structure;
a first crystalline layer formed of a first material;
a second crystalline layer between the first crystalline layer and the FeCo layer, the second crystalline layer formed of a second material different from the first material, and the second crystalline layer interfacing both the FeCo layer and the first crystalline layer; and
a main pole and a hot seed layer, wherein:
the hot seed layer comprises the iron-cobalt (FeCo) layer; and
one or more of the first crystalline layer and the second crystalline layer is in a gap between the hot seed layer and the main pole.

16. The magnetic recording head of claim 15, wherein the main pole comprises one or more shields, wherein at least one of the one or more shields comprises the FeCo layer.

17. The magnetic recording head of claim 15, wherein the main pole comprises one or more shields, wherein at least one of the one or more shields is a trailing shield that comprises the FeCo layer.

18. The magnetic recording head of claim 15, wherein the first crystalline layer is formed of an alloy including one or more of ruthenium (Ru), aluminum (Al), chromium (Cr), or molybdenum (Mo).

19. A magnetic recording device comprising the magnetic recording head of claim 15.

20. A magnetic recording head, comprising:
an iron-cobalt (FeCo) layer having a crystalline structure that is a cubic lattice structure;
a first crystalline layer formed of a first material;
a second crystalline layer between the first crystalline layer and the FeCo layer, the second crystalline layer formed of a second material different from the first material, and the second crystalline layer interfacing both the FeCo layer and the first crystalline layer; and
a main pole and one or more shields for the main pole, wherein at least one of the one or more shields comprises the iron-cobalt (FeCo) layer.

21. The magnetic recording head of claim 20, wherein the at least one of one or more shields is a trailing shield that comprises the iron-cobalt (FeCo) layer.

22. The magnetic recording head of claim 20, wherein the crystalline structure of the FeCo layer is body-centered cubic (BCC) and has a texture of <100>.

23. The magnetic recording head of claim 20, wherein the second crystalline layer includes chromium (Cr) at a Cr atomic percentage that is 85% or greater.

24. The magnetic recording head of claim 20, further comprising an amorphous seed layer, wherein the first crystalline layer is disposed between the amorphous seed layer and the second crystalline layer.

25. The magnetic recording head of claim 24, wherein the amorphous seed layer is metallic or ionic.

26. The magnetic recording head of claim 25, wherein the amorphous seed layer is formed of a metallic material that includes one or more of nickel (Ni), zirconium (Zr), tantalum (Ta), niobium (Nb), or iron (Fe).

27. The magnetic recording head of claim 25, wherein the amorphous seed layer is formed of an ionic material that includes one or more of (Al), oxygen (O), or silicon (Si).

28. A magnetic recording device comprising the magnetic recording head of claim 20.

* * * * *